(12) United States Patent
Koo et al.

(10) Patent No.: US 7,904,984 B2
(45) Date of Patent: Mar. 15, 2011

(54) METHOD OF CONTROLLING MOTOR-DRIVEN WASHING MACHINE AND CONTROL SYSTEM FOR THE SAME

(75) Inventors: Bon Kwon Koo, Seoul (KR); Kwon Ki Hong, Changwon-shi (KR); Jae Cheol Lyu, Changwon-shi (KR); Woon Yong Lee, Gwangju-gwangyok-shi (KR); Jong Chul Bang, Changwon-shi (KR); Min Jin Oh, Changwon-shi (KR); Kweon Son, Changwon-si (KR); Jong Ho Kim, Changwon-shi (KR); In Haeng Cho, Changwon-shi (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 12/461,380

(22) Filed: Aug. 10, 2009

(65) Prior Publication Data

US 2010/0037402 A1 Feb. 18, 2010

Related U.S. Application Data

(62) Division of application No. 10/486,330, filed as application No. PCT/KR03/00960 on May 15, 2003, now abandoned.

(30) Foreign Application Priority Data

| May 15, 2002 | (KR) | 10-2002-0026886 |
| May 16, 2002 | (KR) | 10-2002-0027127 |
| May 16, 2002 | (KR) | 10-2002-0027132 |
| Jul. 11, 2002 | (KR) | 10-2002-0040211 |
| Jul. 11, 2002 | (KR) | 10-2002-0040292 |
| Jul. 29, 2002 | (KR) | 10-2002-0044687 |
| Nov. 25, 2002 | (KR) | 10-2002-0073580 |
| Nov. 26, 2002 | (KR) | 10-2002-0073898 |
| Nov. 26, 2002 | (KR) | 10-2002-0074052 |
| Nov. 26, 2002 | (KR) | 10-2002-0074054 |

(51) Int. Cl.
*D06F 35/00* (2006.01)

(52) U.S. Cl. .......................................................... 8/158
(58) Field of Classification Search ................ 8/158
See application file for complete search history.

(56) References Cited

U.S. PATENT DOCUMENTS 4,554,989 A 11/1985 Gruich et al.
(Continued)

FOREIGN PATENT DOCUMENTS

CN 85109675 6/1986
(Continued)

OTHER PUBLICATIONS

Machine translation of JP 09-206489 (Aug. 1997).*

*Primary Examiner* — Michael Barr
*Assistant Examiner* — Samuel A Waldbaum
(74) *Attorney, Agent, or Firm* — McKenna Long & Aldridge LLP

(57) ABSTRACT

A method of controlling a motor-driven washing machine. The method includes increasing a speed of a motor from zero to a first predetermined speed $W_1$. Reducing the motor speed from $W_1$ to a second predetermined speed $W_2$ and measuring the deceleration period. Increasing the motor speed from $W_2$ to a third predetermined speed $W_3$ and braking the motor according to a slow brake logic if a first interruption of the motor is ordered during the step of increasing the motor speed from $W_2$ to $W_3$. Increasing the motor speed from $W_3$ to a fourth predetermined speed $W_4$ and selecting one of plurality of rapid-brake logics on the basis of the measured deceleration period and braking the motor according to the selected rapid-brake logic if a second interruption of the motor is ordered during the step of increasing the motor speed from $W_3$ to $W_4$.

11 Claims, 20 Drawing Sheets

U.S. PATENT DOCUMENTS

| | | | |
|---|---|---|---|
| 5,218,283 A | | 6/1993 | Wills et al. |
| 5,247,231 A | | 9/1993 | Glucina |
| 5,325,677 A | * | 7/1994 | Payne et al. .............. 68/12.04 |
| 5,396,413 A | | 3/1995 | Kaneko et al. |
| 5,507,054 A | * | 4/1996 | Blauert et al. ................ 8/159 |
| 5,551,261 A | | 9/1996 | Lyu et al. |
| 5,586,455 A | | 12/1996 | Imai et al. |
| 5,694,793 A | * | 12/1997 | Nishimura et al. ......... 68/12.27 |
| 5,704,136 A | * | 1/1998 | Cho .............................. 34/562 |
| 5,824,114 A | | 10/1998 | Pyo |
| 5,954,939 A | | 9/1999 | Kanekuni et al. |
| 6,049,930 A | | 4/2000 | Hisano et al. |
| 6,257,027 B1 | | 7/2001 | Imai |
| RE37,360 E | | 9/2001 | Duncan |
| 6,332,343 B1 | | 12/2001 | Koketsu et al. |
| 6,369,538 B1 | | 4/2002 | Youn et al. |
| 6,445,879 B1 | | 9/2002 | Youn et al. |
| 6,539,753 B1 | | 4/2003 | Ito et al. |
| 7,082,792 B2 | | 8/2006 | Ahn |
| 7,086,254 B2 | | 8/2006 | Lim et al. |
| 7,089,769 B2 | | 8/2006 | Lim et al. |
| 7,171,715 B2 | | 2/2007 | Yoon et al. |
| 7,254,965 B2 | | 8/2007 | Ahn |
| 2001/0031679 A1 | | 10/2001 | Hammerbeck |
| 2002/0095269 A1 | | 7/2002 | Natalini et al. |
| 2002/0124328 A1 | | 9/2002 | Sharp et al. |
| 2004/0114557 A1 | | 6/2004 | Bryan et al. |
| 2005/0120759 A1 | | 6/2005 | Choi et al. |

FOREIGN PATENT DOCUMENTS

| | | | |
|---|---|---|---|
| CN | 87204096 | | 1/1988 |
| CN | 87208790 | | 9/1988 |
| CN | 1282138 | | 1/2001 |
| CN | 1296095 | | 5/2001 |
| DE | 2 629 128 | | 12/1977 |
| GB | 1 584 561 | | 2/1981 |
| JP | 62-221395 | | 9/1987 |
| JP | 8-224394 | | 9/1996 |
| JP | 09206489 | * | 8/1997 |
| JP | 11-090081 | | 4/1999 |
| JP | 11-169590 | | 6/1999 |
| JP | 11-275889 | | 10/1999 |
| JP | 2001-113088 | | 4/2001 |
| JP | 2001-137596 | | 5/2001 |
| JP | 2001-276467 | | 10/2001 |
| KR | 10-1995-0008819 | | 4/1995 |
| KR | 20-0122861 | | 5/1998 |
| KR | 10-1998-046473 | | 9/1998 |
| KR | 10-1999-0018530 | | 3/1999 |
| KR | 10-0311651 | | 10/2001 |

* cited by examiner

METHOD OF CONTROLLING MOTOR-DRIVEN WASHING MACHINE AND CONTROL SYSTEM FOR THE SAME

CROSS-REFERENCE TO RELATED APPLICATIONS

This application is a divisional application of application Ser. No. 10/486,330, filed Jan. 14, 2005 now abandoned which is the 35 U.S.C. §371 National Stage entry of International Application No. PCT/KR03/00960,filed May 15, 2003, and claims the benefit of Korean Application No. P2002-26886 filed on May 15, 2002, Korean Application No. P2002-27127 filed on May 16, 2002, Korean Application No. P2002-27132 filed on May 16, 2002, Korean Application No. P2002-40211 filed on Jul. 11, 2002, Korean Application No. P2002-40292 filed on Jul. 11, 2002, Korean Application No. P2002-44687 filed on Jul. 29, 2002, Korean Application No. P2002-73580 filed on Nov. 25, 2002, Korean Application No. P2002-73898 filed on Nov. 26, 2002, Korean Application No. P2002-74052 filed on Nov. 26, 2002, and Korean Application No. P2002-74054 filed on Nov. 26, 2002, all of which are hereby incorporated by reference as if fully set forth herein.

BACKGROUND OF THE INVENTION

1. Field of the Invention

The present invention relates to a washing machine, and more particularly, to a method of controlling a motor-driven washing machine and a control system for the same.

2. Discussion of the Related Art

Motor-driven automatic washing machines are common these days. A typical washing machine may include a motor for driving an agitator and a rotatable tub severing both as a wash tub and a dehydration tub and the motor is coupled to a drive shaft. During a typical wash or rinse cycle, the motor is caused to rotate back and forth to agitate the clothes and water in the wash tub for cleaning or rinsing of the clothes.

In addition, during a spine cycle, the motor spins the wash tub containing a load of wet clothes to be dehydrated to remove water from the wet clothes by centrifugal force. Because the wash tub rotates at a very high speed, many problems can occur. For example, if the operation of the motor is not stopped properly when a user mistakenly opens a washer door and sticks a hand into inside of the tub, the user may be seriously harmed. The user should be advised of such error promptly so that the error of the motor or any other components that associates with the motor can be quickly fixed.

In another example, when a control for braking a motor in motion during a spin cycle is not properly done, the motor-clutch mechanism may generates a noise and the mechanism can be damaged due to the motion of the heavy wash tub at a high speed.

SUMMARY OF THE INVENTION

Accordingly, the present invention is directed to a method of controlling a motor-driven washing machine and a control system for the same that substantially obviate one or more problems due to limitations and disadvantages of the related art.

An object of the present invention is to provide a method of controlling a motor-driven washing machine and a control system for the same that prevent a motor-clutch mechanism from generating a noise and being damaged.

Another object of the present invention is to provide a method of controlling a motor-driven washing machine and a control system for the same, in which a proper control can be achieved even if an initial algorithm for braking a motor is not executed properly.

Another object of the present invention is to provide a method of controlling a motor-driven washing machine and a control system for the same in which, malfunction of a motor during a motor interruption is determined and a corresponding error message is displayed for warning a user of the malfunction.

Another object of the present invention is to provide a method of controlling a motor-driven washing machine that performs a motor interruption based on the weight of a load of clothes to be washed or dehydrated.

Another object of the present invention is to provide a method of controlling a motor-driven washing machine and a control system for the same that prevent a motor from being damaged due to reverse voltages generated by the motor during motor-brake operation.

Another object of the present invention is to provide a method of controlling a motor-driven washing machine and a control system for the same, in which malfunction of a braking resistor is detected and motor operation is stopped for avoiding any motor damage.

Another object of the present invention is to provide a method of controlling a motor-driven washing machine and a control system for the same that minimize the time it takes to reduce the motor speed.

Another object of the present invention is to provide a method of controlling a motor-driven washing machine and a control system for the same, in which a washer door is locked only when the speed of a motor reaches a predetermined speed.

Another object of the present invention is to provide a method of controlling a motor-driven washing machine and a control system for the same that prevent the motor from being damaged during a spin cycle.

A further object of the present invention is to provide a circuit for limiting a motor current in an electrical appliance that the value of the limiting current can be varied.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of controlling a motor-driven washing machine includes the steps of generating an interruption command for braking a motor in motion during a wash cycle; applying a first phase-reversed voltage to a voltage input terminal of the motor in motion, the first phase-reversed voltage corresponding to a first current speed of the motor; and electrically shorting the voltage input terminal of the motor for a predetermined period of time if a second phase-reversed voltage is higher than or equal to a critical voltage level, the second phase-reversed voltage corresponding to a second current speed of the motor.

In another aspect of the present invention, a control system for a washing machine includes a motor rotating at least one of a washing tub and an agitator provided in the washing machine in a wash cycle; a motor brake unit initially applying a first phase-reversed voltage to a voltage input terminal of the motor when an interruption command for braking the motor in motion is generated during the wash cycle, the first phase-reversed voltage corresponding a first current speed of the motor in motion, and a controller measuring a second current speed of the motor and generating a control signal if a second phase-reversed voltage is higher than or equal to a critical voltage level, the second phase-reversed voltage corresponding to the second current speed of the motor, wherein the motor brake unit electrically shorts the voltage input terminal of the motor upon receiving the control signal from the controller.

In another aspect of the present invention, a method of controlling a motor-driven washing machine having a load controller includes the steps of initiating a wash cycle by operating a plurality of load units including a motor according to a wash option selected by a user; transmitting a brake control signal to the load controller if an opening of a washer door provided in the washing machine is detected, the load controller executing a load-brake algorithm to brake operations of the plurality of load units in response to the brake control signal; determining whether the load-brake algorithm is properly executed by the load controller by communicating with the load controller; and transmitting control signals directly to the plurality of the load units so as to brake the operations of the plurality of load units if the load-brake algorithm is properly executed by the load controller.

In another aspect of the present invention, a control system for a washing machine includes a door sensor detecting an opening of a washer door provided in the washing machine; a load controller coupled to the door sensor for executing a load-brake algorithm to brake operations of a plurality of load units of the washing machine when the opening of the washer door is detected by the door sensor; a main controller transmitting control signals directly to the plurality of load units so as to brake the operations of the plurality of load units if the load-brake algorithm is not properly executed by the load controller.

In another aspect of the present invention, a method of controlling a motor-driven washing machine includes the steps of initiating a wash cycle by operating a motor provided in the washing machine according to a washing option selected by a user; generating a motor-brake signal to brake the operation of the motor when a motor-interruption command is generated and measuring a brake period which represents a total length of time it takes to completely stop the operation of the motor; determining malfunction of the motor based on whether the measured brake period exceeds a predetermined period of time; and displaying a warning message on a display unit, the message indicating the determined malfunction of the motor.

In another aspect of the present invention, a control system for a washing machine includes a motor rotating a washing tub or an agitator provided in the washing machine according to a washing option selected by a user; a microprocessor operatively coupled to the motor for braking operation of the motor when a motor-interruption command is generated and measuring a brake period which represents a total length of time it takes to completely stop the operation of the motor, the microprocessor determining malfunction of the motor based on whether the measured brake period exceeds a predetermined period of time; and a display unit displaying a warning message indicating the determined malfunction of the motor upon receiving a control signal from the microprocessor.

In another aspect of the present invention, a method of controlling a motor-driven washing machine includes the steps of increasing a speed of a motor from zero to a first predetermined speed $W_1$ to initiate a spin cycle, during which the motor rotates a washing tub containing a load of clothes to be dehydrated; reducing the motor speed from $W_1$ to a second predetermined speed $W_2$ and measuring a deceleration period that it takes to reduce the motor speed from $W_1$ to $W_2$; increasing the motor speed from $W_2$ to a third predetermined speed $W_3$; braking the motor according to a slow brake logic if a first interruption of the motor is ordered during the step of increasing the motor speed from $W_2$ to $W_3$; increasing the motor speed from $W_3$ to a fourth predetermined speed $W_4$; and selecting one of plurality of rapid-brake logics on the basis of the measured deceleration period and braking the motor according to the selected rapid-brake logic if a second interruption of the motor is ordered during the step of increasing the motor speed from $W_3$ to $W_4$.

In another aspect of the present invention, a method of controlling a motor-driven washing machine includes the steps of applying a phase-reversed voltage to a voltage terminal of a motor in motion to brake the motor when a motor-interruption command is generated during a wash or spin cycle, the motor generating a reverse voltage and a reverse current when being braked; initially reducing the reverse voltage generated by the motor by allowing the reverse current to flow through a braking resistor connected to the motor if the reverse voltage is higher than a predetermined voltage level; determining malfunction of the braking resistor on the basis of an actual current-flow period of the braking resistor; and electrically shorting the voltage terminal of the motor for a predetermined period of time if the malfunction of the braking resistor is determined.

In another aspect of the present invention, a control system for a washing machine includes a motor rotating a washing tub or an agitator provided in the washing machine in a wash or spin cycle; a motor driving unit applying a phase-reversed voltage to a voltage terminal of the motor in motion if a motor-interruption command is generated, the motor generating a reverse voltage and a reverse current when the phase-reversed voltage is applied; a braking resistor connected to the motor; and a microprocessor initially reducing the reverse voltage generated by the motor by allowing the reverse current to flow through the braking resistor if the reverse voltage is higher than a predetermined voltage level, the microprocessor electrically shorting the voltage terminal of the motor for a predetermined period of time if it determines malfunction of the braking resistor on the basis of an actual current-flow period of the braking resistor.

In another aspect of the present invention, a method of controlling a motor-driven washing machine includes the steps of determining whether a current DC voltage of a driving unit driving a motor is less than or equal to a predetermined voltage level for each predetermined period; measuring a current leading phase angle of the current DC voltage if the current voltage is less than or equal to the predetermined voltage level; and decreasing the current leading phase angle of the current DC voltage by a first predetermined level if the measured leading phase angle is greater than zero.

In another aspect of the present invention, a control system for a motor-driven washing machine includes an electrical motor; a driving unit that applies an input voltage to the motor to drive the motor; a voltmeter that measures a reverse voltage generated by the motor for each predetermined period; and a microprocessor reducing a speed of the motor if the measured reverse voltage is less than or equal to a predetermined voltage level.

In another aspect of the present invention, a method of controlling a motor-driven washing machine includes the steps of determining whether a command for a spin cycle is received from a user; and locking a washer door on the basis of whether a speed of a motor reaches a first predetermined speed if the spin cycle command is received, the motor rotating a washing tub containing a load of clothes to be dehydrated. The step of locking the washer door includes increasing the motor speed from zero to the first predetermined speed to initiate the spin cycle; and generating a control signal to a door locking unit if the motor speed is equal to the first predetermined speed, the door locking unit locking the washer door upon receiving the control signal.

In another aspect of the present invention, a control system for a washing machine includes a washing tub containing a load of clothes to be dehydrated; an electrical motor rotating the washing tub if a command for a spin cycle is received from a user; and a microprocessor locking a washer door on the basis of whether a speed of the motor reaches a first predetermined speed.

In another aspect of the present invention, a method of controlling a motor-driven washing machine includes the steps of determining whether a first current speed of a motor is less than a first predetermined speed if a motor-interruption of the motor is generated during a spin cycle, the motor rotating a washing tub containing a load of clothes to be dehydrated during the spin cycle; and braking the motor in motion by shorting power terminals of the motor for a first predetermined period if the first current speed is less than the first predetermined speed. The method further includes the steps of applying phase-reversed voltages to the power terminals for a second predetermined period if a second current speed of the motor is less than the first predetermined speed and greater than a second predetermined speed; and allowing a braking resistor connected to the motor to flow reverse currents generated by the motor so as to dissipate electrical power into heat if the second current speed of the motor is less than the first predetermined speed and greater than the second predetermined speed.

In another aspect of the present invention, a control system for a washing machine includes a washing tub containing a load of clothes to be dehydrated; a motor rotating to the washing tub during a spin cycle; and a microprocessor braking the motor shorting power terminals of the motor if a motor-interruption is generated during the spin cycle and if a first current speed of the motor is less than a first predetermined speed.

In another aspect of the present invention, a circuit for limiting a motor current in an electrical appliance includes a first resistor and a dip switch connected between a power source and a ground in series, the dip switch comprising a plurality of resistors having different resistances; a capacitor connected to the dip switch in parallel; an op amplifier having an inverting input connected to a node between the first resistor and the dip switch; and a third resistor connected between an noninverting input of the op amplifier and a ground, wherein any one of the plurality of resistors of the dip switch can be conveniently selected for limiting a current that flows through the third resistor.

In another aspect of the present invention, a method of controlling a motor-driven washing machine includes the steps of measuring a voltage of a node between the transistor and the braking resistor; displaying a warning message indicating that the brake resistor is in an inoperative condition if the measured voltage is equal to zero; repeating the step of determining if a command for a wash cycle is received; and initiating the wash cycle if the measured voltage of the node is not equal to zero.

In another aspect of the present invention, a control system for a washing machine includes a motor rotating a wash tub or an agitator of the washing machine; a driving unit that drives the motor by applying input voltages to the motor; a pair of a braking resistor and a transistor connected to the driving unit in parallel, the transistor being connected to the braking resistor in series; a voltmeter measuring a voltage of a node between the transistor and the braking resistor; and a microprocessor generating a warning signal if the measured voltage of the node is not equal to zero.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Embodiment (1)

Figure 1A:
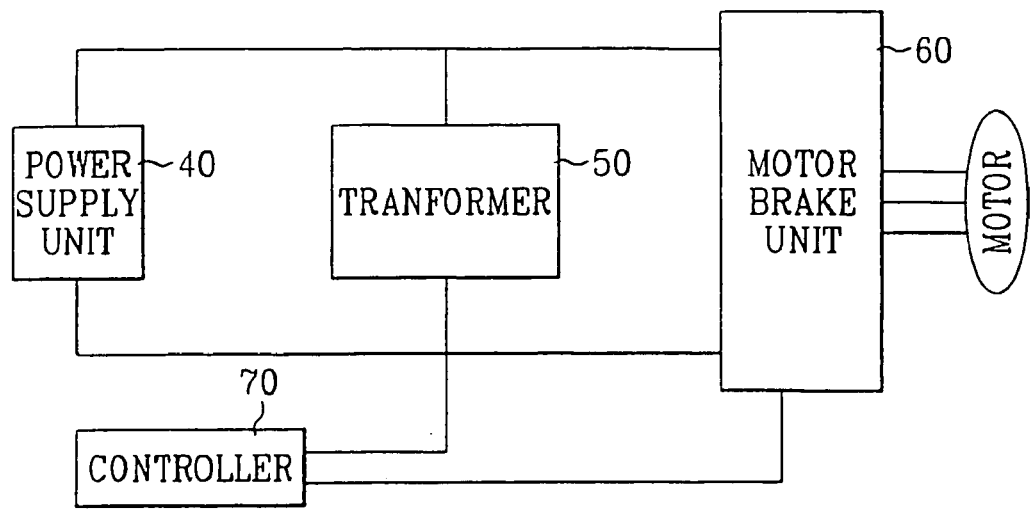
FIG. 1A illustrates a control system that drives a motor provided in a washer according to a first embodiment of the present invention.

FIG. 1A illustrates a control system that drives a motor provided in a washer according to a first embodiment of the present invention. Referring to FIG. 1A, the control system includes a power supply unit 40 rectifying and/or smoothing an AC power voltage generated by a power source, a transformer 50 having a converter (not illustrated) and for converting the rectified AC voltage into a DC voltage and a capacitor (not illustrated) for storing the converted DC voltage, a motor 81 rotating a tub and/or an agitator provided in the washer, a motor brake unit 60 braking the operation of the motor 81 by applying an input voltage to the motor 81 upon receiving a brake control signal, and a controller 70 measuring the DC voltage stored by the transformer 50 and generating the brake control signal to the motor brake unit 60.

The DC voltage stored in the capacitor of the transformer 50 is used for driving the motor 81, and the motor 81 transmits the dynamic energy to a clutch (not illustrated) that engages with the tub and/or agitator provided in the washer for washing a load of clothes to be washed. When a user inputs a command for interrupting (braking) the motor operation by turning the power of the washer off, opening a washer door, or manually touching a key control panel, the controller 70 generates a motor interruption signal to the motor brake unit 60. In addition, the controller 70 continuously monitors the speed of the motor 81 and outputs the motor speed information to the transformer 50, which then applies a voltage corresponding to the motor speed to the motor brake unit 60.

The motor brake unit 60 shifts the phase of the voltage outputted by the transformer 50 by 180 degrees and applies the phase-shifted voltage (phase-reversed voltage) to the motor 81 so as to brake the motor operation. However, when a phase-shifted voltage corresponding to a speed value higher than a certain motor speed is applied to the motor 81, a noise may be generated in the motor-clutch mechanism and the mechanism may be damaged. This is because the actual rotational displacement of the clutch is greater than the rotational displacement of the motor 81 due to the rotational speed difference between the motor 81 and the clutch. For this reason, the controller 70 initially stores a critical phase-shift voltage Vc that starts to generate the noise in the motor-clutch mechanism and that may damage the mechanism, and it performs a motor brake by shorting the power input terminals of the motor 81 if the current phase-reversed voltage is greater than $V_c$.

Figure 1B:
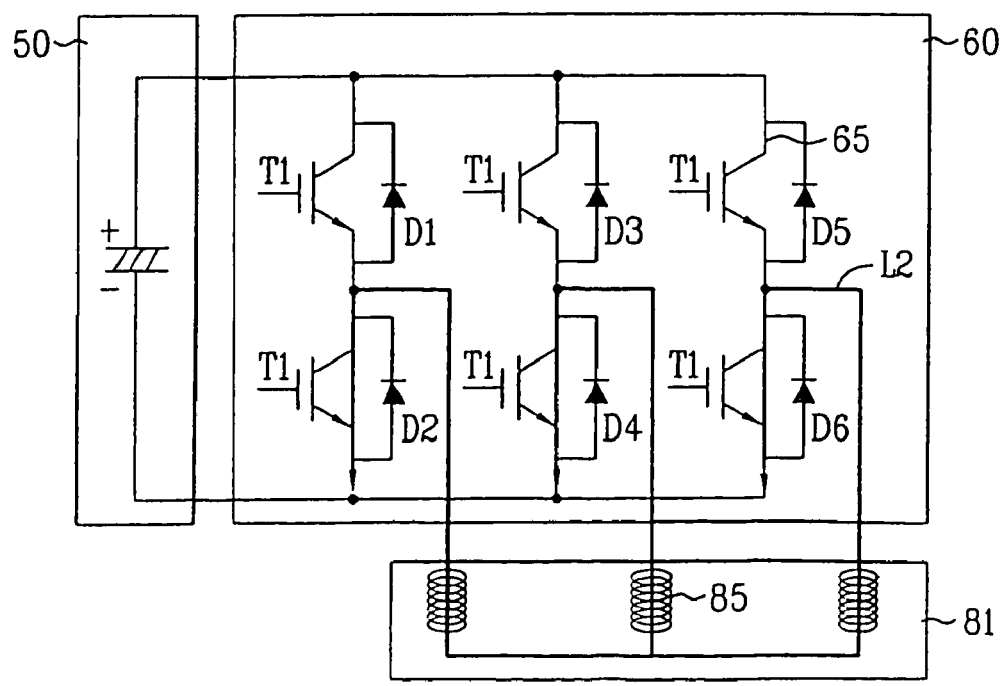
FIG. 1B illustrates the detailed structures of the motor brake unit 60, the transformer 50 and the motor 81 shown in FIG. 1A.

FIG. 1B illustrates the detailed structures of the motor brake unit 60, the transformer 50 and the motor 81 shown in FIG. 1A. As shown in FIG. 1B, the motor brake unit 60 comprises three pairs of insulated gate bipolar transistors (hereinafter, "transistor") connected in parallel, where each pair comprises two transistors connected in series. A diode (D1 to D6) is connected to each transistor, which can be shorted by the diode. Transistors T2, T4 and T6, which are directly connected to three winded wires of the motor 81, apply the voltage supplied by the transformer to the winded wires of the motor 81, respectively, for operating or braking the motor 81.

Figure 1C:
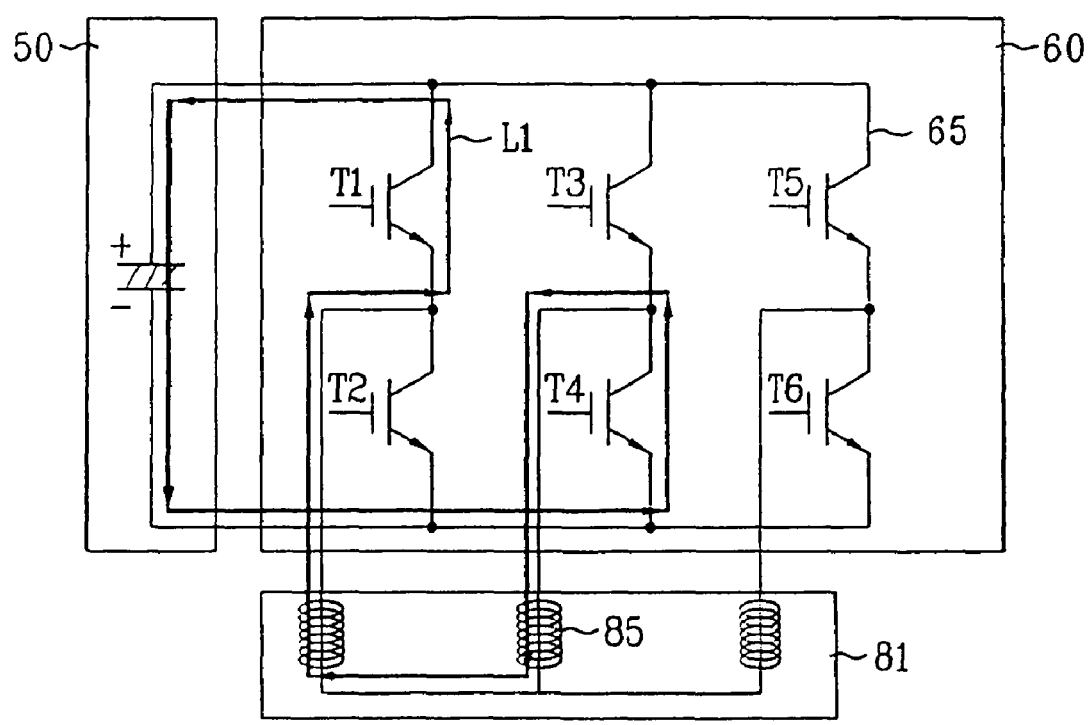
FIG. 1C illustrates a current flow (L1) of the motor brake unit 60 when the phase-shifted voltage applied to the motor brake unit 60 is less than $V_c$.

FIG. 1C illustrates a current flow (L1) of the motor brake unit 60 when the phase-shifted voltage applied to the motor brake unit 60 is less than $V_c$. On the other hand, a current flow (L2) of the motor brake unit 60 when the phase-shifted voltage is greater than or equal to $V_c$. In other words, if the controller 70 determines that the voltage being inputted to motor brake unit 60 is greater than or equal to $V_c$, the motor brake unit 60 shorts the input terminals of the motor 81 as shown in FIG. 1B for a predetermined period of time (e.g., 0.5 sec). As shown in FIG. 1B, the connections between the transformer 50 and the motor 81 are shorted by activating T2, T4 and T6 and D2, D4 and D6 and by deactivating T1, T3, and T5. Therefore, the voltage of the transformer 50 is not applied, but instead, the voltage previously applied to the winded wires 85 of the motor 81 are consumed for braking the motor operation. After the input terminals of the motor 81 are shorted for 0.5 sec, the speed of the motor 81 is reduced and the reduced motor speed is transmitted to the controller 70, which then applies a voltage corresponding to the reduced motor speed to the motor driving unit 60 so that the motor 81 can be stopped without generating any noise in the motor-clutch mechanism.

Figure 1D:
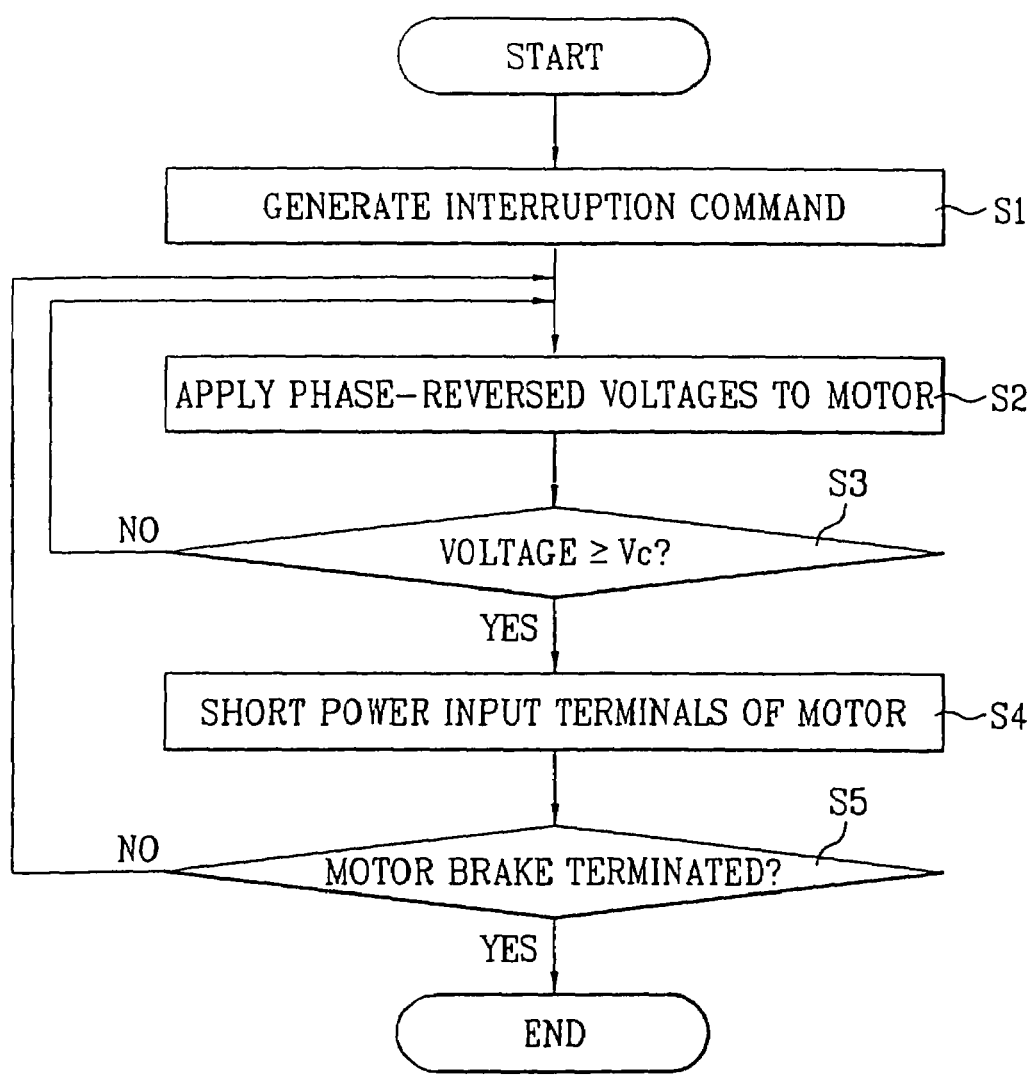
FIG. 1D illustrates a method of controlling a motor provided in a washer according to the first embodiment of the present invention.

Reference will now be made in detail to a method of controlling a motor provided in a washer according to the first embodiment of the present invention, which is illustrated in FIG. 1D. Initially, a user inputs a command for interrupting (braking) the motor operation by turning the power of the washer off, opening a washer door, or manually touching a key input panel (SS1). Next, the controller 70 controls the transformer 50 to apply a voltage corresponding to the current motor speed to the motor brake unit 60, which then performs a motor brake by shifting the phase of the voltage by 180 degrees and applying the phase-shifted voltage (phase-reversed voltage) to the motor 81 (S2). Thereafter, the controller 70 measures the current speed of the motor 81 again and compares the voltage corresponding to the measured motor speed with a critical phase-shift voltage Vc (S3), which is previously stored by the controller and represents a value of the phase-shifted voltage that causes the motor-clutch mechanism to generate a noise if applied to the motor 81.

If the voltage corresponding to the current motor speed is less than Vc, steps S2 and S3 are repeated again. On the other hand, if the voltage is greater than or equal to Vc, the controller 70 performs a motor brake by shoring the power input terminals of the motor 81 for a predetermined period of time T (e.g., 0.5 sec) so that the voltage corresponding the current motor speed is not applied to the motor 81. Next, if the controller 70 determines that the operation of the motor 81 is stopped (S5), it terminates the motor brake algorithm. Otherwise, steps S1 to S5 are repeated until the motor operation is stopped.

Embodiment (2)

Figure 2A:
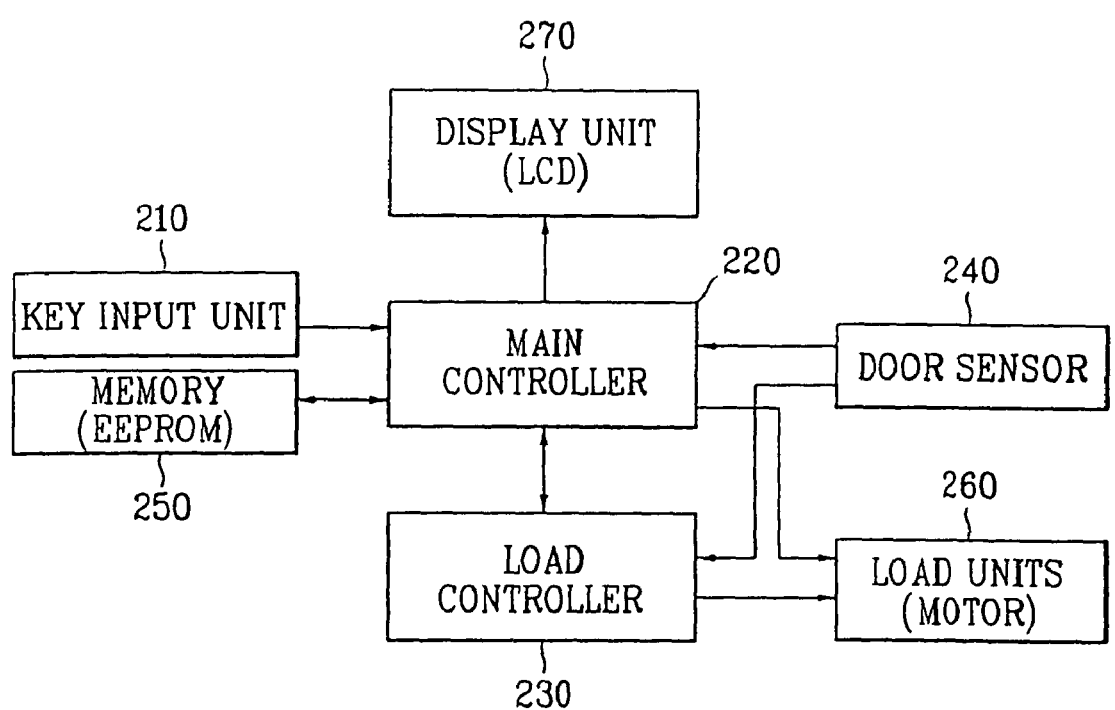
FIG. 2A illustrates an apparatus of controlling load units (e.g., a motor) in a washer according to a second embodiment of the present invention.

FIG. 2A illustrates an apparatus of controlling load units (e.g., a motor) in a washer according to a second embodiment of the present invention. Referring to FIG. 2A, the apparatus includes a key input unit 210 receiving commands from a user for a wash cycle, a door sensor 240 for sensing opening of a washer door of the washer, and a load controller 230 that executes an interrupt program or algorithm for interrupting operations of load units 260 upon receiving a signal indicating the opening of the washer door, where the load units 260 include a motor rotating a tub and/or an agitator provided in the washer, a water supply system supplying water to the tub, and a drain system draining water from the tub. The apparatus shown in FIG. 2A further includes a main controller 220 that generates control signals to initiate the wash cycle according to the user's commands and controls the operations of the load units based upon whether the interrupt program is properly executed by the load controller 230. The apparatus further includes a memory 250 (e.g., EEPROM) for storing a plurality of parameter values that correspond to various washing options and a display unit 270, such as an LCD display, that displays information indicating the opening of the washer door upon receiving a control signal from the main controller 220.

When a user inputs commands for a wash cycle through the key input unit 210, the main controller 220 transmits the commands to the load controller 230. Then the load controller 230 performs a wash cycle by driving the load units 260 according to the received commands. The load units 260 include a motor rotating a tub, and it may further include a water supply supplying water to the tub and a drain draining water from the tub.

When the door sensor 240 detects or senses opening of a washer door, it sends a signal indicating the opening of the washer door to the load controller 230 and the main controller 220. Thereafter, the load controller 230 runs an interrupt program (e.g., executing an interrupt algorithm) for interrupting or suspending operations of the load units 260. The main controller 220 determines whether the load controller 230 has executed the interrupt program properly. If the main controller 220 determines that the load controller 230 has not executed the program properly, it generates a direct control signal to the load units 260 for properly interrupting or suspending the operations of the load units 260. For example, the load controller 230 periodically transmits speed (RPM) information of a motor which is operatively coupled to the load controller 30 so that the main controller 220 can determine whether the load controller 230 has executed the interrupt program properly by monitoring the speed information of the motor.

Figure 2B:
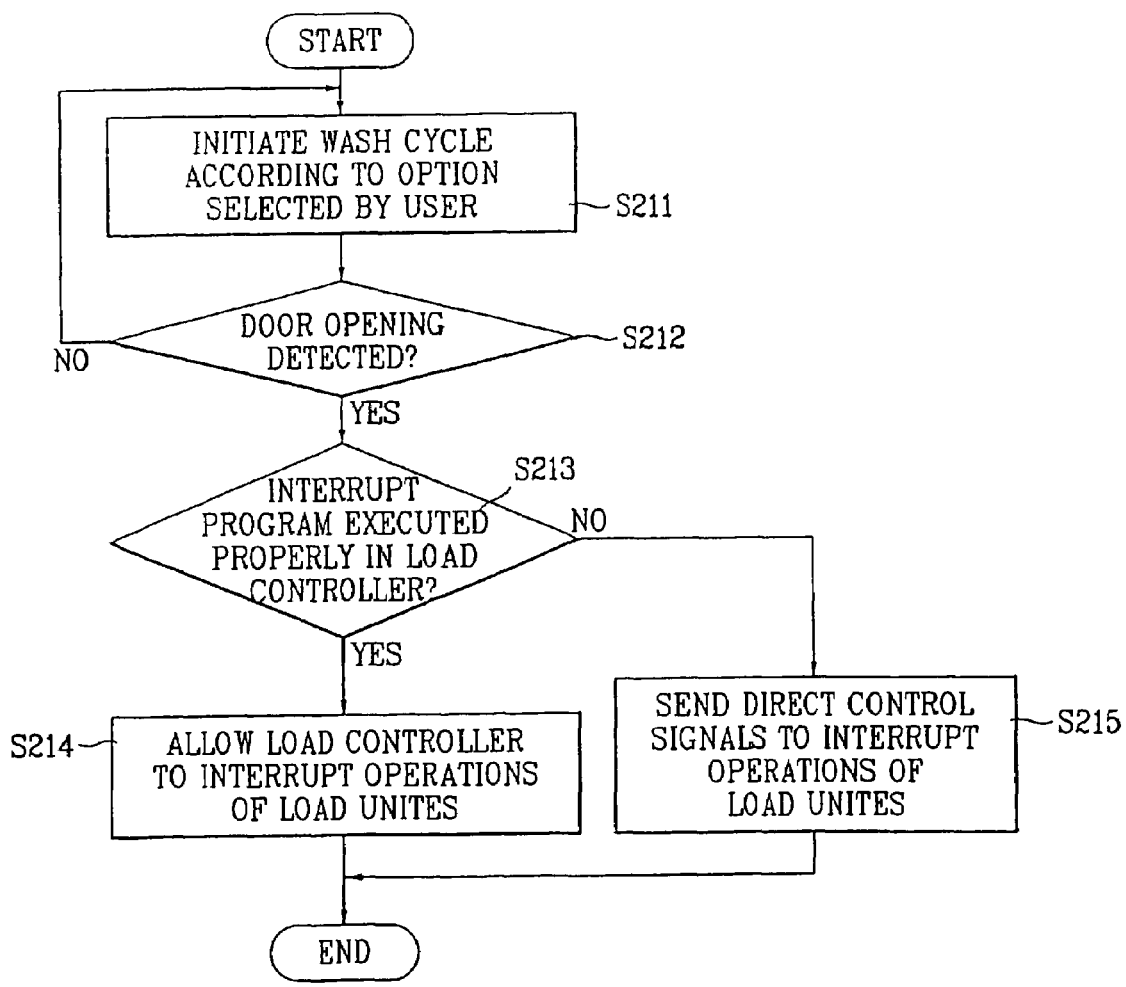
FIG. 2B illustrates a method of controlling load units in a washer according to the second embodiment of the present invention.

Reference will now be made in detail to a method of controlling load units in a washer according to the second embodiment of the present invention, which is illustrated in FIG. 2B. Referring to FIG. 2B, the main controller 220 initially generates control signals to initiate a wash cycle according to a washing option selected by a user (S211). If the main controller 220 detects opening of a washer door during the wash cycle (S212), it determines whether the load controller 230 has executed an interruption program (e.g., an interrupt algorithm) properly by receiving operation data of the load units 260 from the load controller 230 via a data communication line, such as a serial communication line, and by monitoring the received operation data (S213). If it is determined in step S213 that an interruption program is properly executed by the load controller 230, then the main controller 220 allows the load controller to interrupt the operations of the load units 260 (S214). On the other hand, if the interrupt program is not properly executed, the main controller 220 sends direct control signals to the load units 260 for interrupting the operations of the load units 260 (S215). One of the advantages of controlling the load units of a washer according to the second embodiment described above is that a reliable control for interrupting operations of the load units is still achieved even when any error occurs in interrupting the operations of the load units by the load units.

Embodiment (3)

Figure 3A:
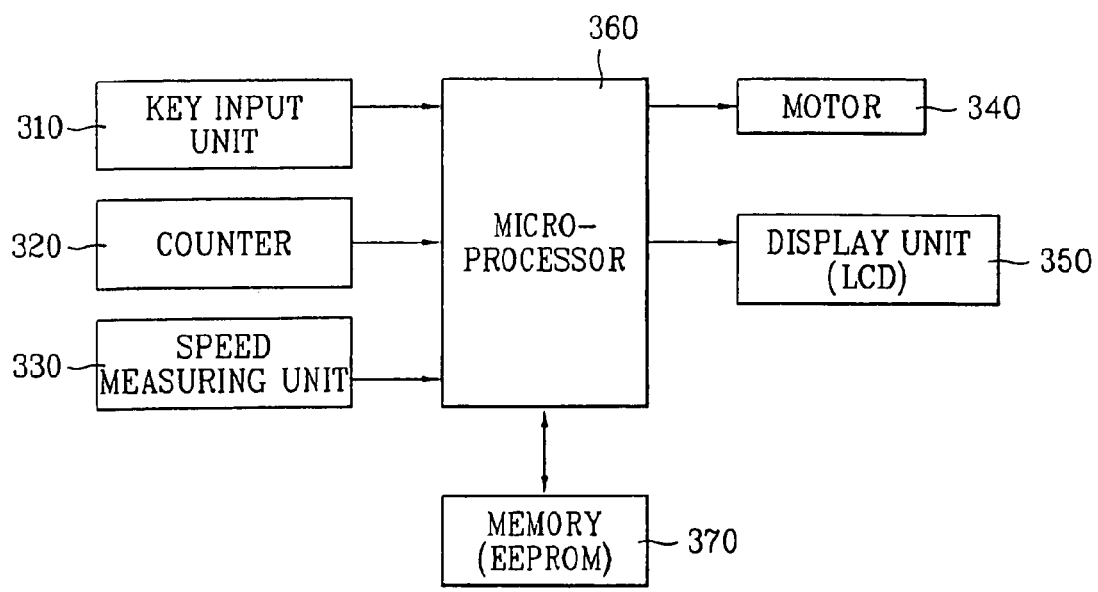
FIG. 3A illustrates an apparatus of detecting malfunction of a motor in a washer according to a third embodiment of the present invention.

FIG. 3A illustrates an apparatus of detecting malfunction of a motor in a washer according to a third embodiment of the present invention. Referring to FIG. 3A, the apparatus includes a key input unit 310 receiving commands from a user for a wash cycle, a motor 340 rotating a tub and/or an agitator in the washer, a speed measuring unit 330 measuring the speed of the motor 340, and a counter 320 that measures interruption periods of the motor 340. An interruption period of the motor 340 represents a period of time that it takes for the motor 340 to completely stop since an interruption command is inputted by the user through the key input unit 310 or opening of a washer door (not illustrated) of the washer is detected. The apparatus shown in FIG. 3A further includes a memory 370 (e.g., EEPROM) that stores the measured interruption period of the motor 340 if the measured period is greater than a predetermined length of time, a microprocessor 360 that determines malfunction of the motor 340 based upon whether a total number of the stored interruption periods, which are greater than the predetermined length of time, is greater than a threshold frequency, and a display unit 350 (e.g., an LCD) that indicates the malfunction of the motor 340 upon receiving a control signal from the microprocessor 360.

When the microprocessor 360 receives an interruption command from the user through the key input unit 310 or detects opening of a washer door of the washer, it generates an interruption signal to the motor 340 to interrupt or stop operation of the motor 340. Thereafter, the counter 320 measures an interruption period of the motor 340, which represents a period of time it takes for the motor 340 to completely stop since the interruption signal is generated by the microprocessor 360, and the microprocessor stores the measured interruption period in the memory 370 if the measured period is greater than a predetermined length of time. Next, the microprocessor 360 determines whether a total number of the interruption periods stored in the memory 370 is greater than a threshold frequency. If the total number of periods is determined to be the threshold frequency, the microprocessor 360 sends a control signal to the display unit 350 to display a message indicating malfunction of the motor 340 to the user.

Figure 3B:
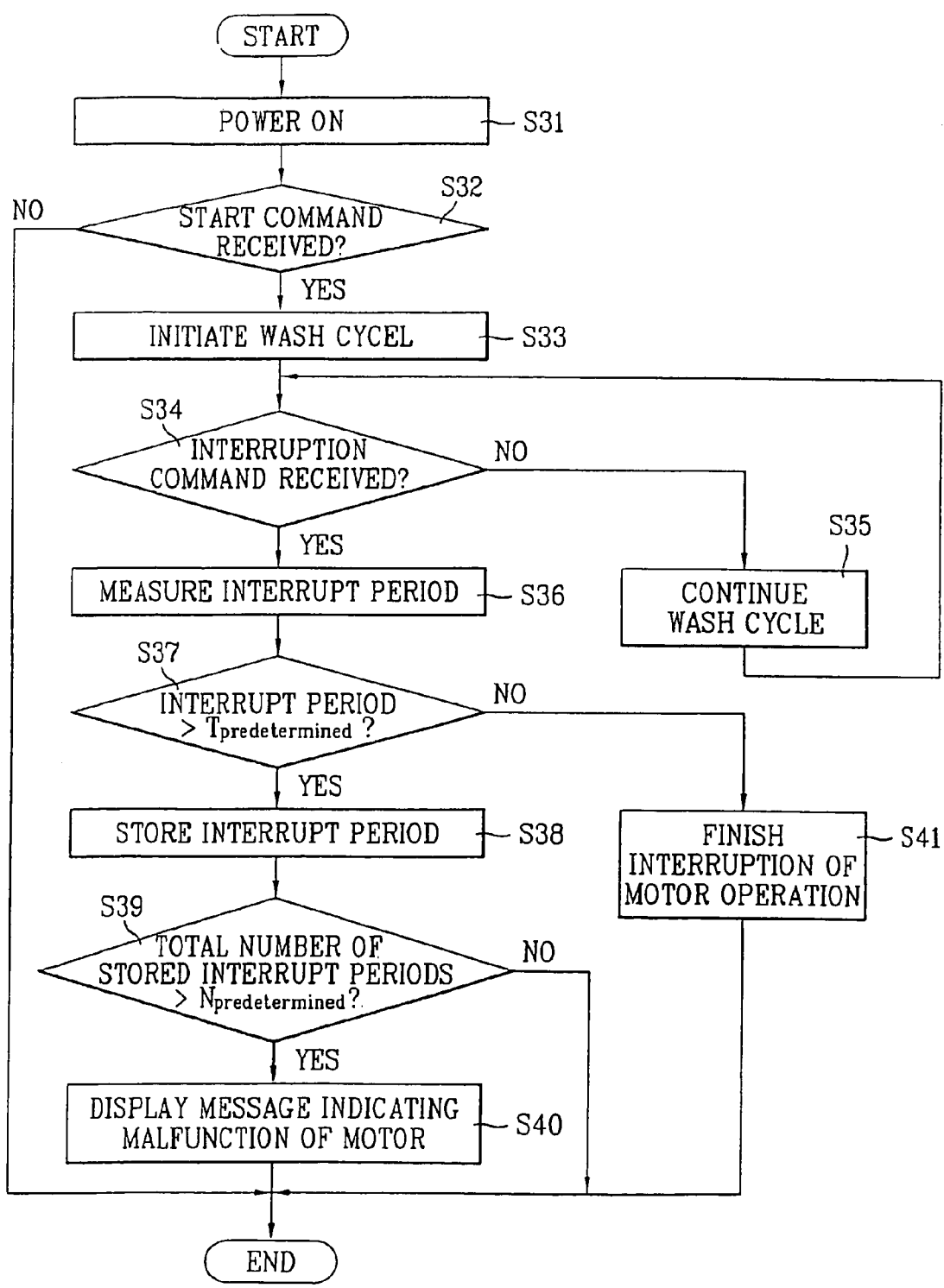
FIG. 3B illustrates a method of detecting malfunction of a motor in a washer according to the third embodiment of the present invention.

Reference will now be made in detail to a method of detecting malfunction of a motor in a washer according to the third embodiment of the present invention, which is illustrated in FIG. 3B. Referring to FIG. 3B, when power is supplied to a washer (S31) and the microprocessor 360 determines that a command for initiating a wash cycle is received from the user through the key input unit 310 (S32), the microprocessor 360 initiates the wash cycle according to a wash option selected by the user (S33). Thereafter, when the microprocessor 360 determines that an interruption command is received from the user through the key input unit 310 or opening of a washer door of the washer is detected (S34), it generates an interruption signal to interrupt or stop operation of the motor 340 and measures an interruption period of the motor 340 using the counter 320 (S36). The interruption period of the motor 340 represents a period of time it takes to completely stop the operation of the motor 360 since the interruption signal is generated. On the other hand, if it is determined in step S34 that no interruption command is received from the user and the opening of the washer door is not detected, the microprocessor 360 continues the wash cycle (S35).

Referring back to FIG. 3B, after the interruption period of the motor 340 is measured in step S36, the microprocessor 360 determines whether the measured interruption period is greater than a predetermined length of time $T_{predetermined}$ (S37). If it is, it stores the measured interruption period in the memory 370 (S38), and otherwise, it finishes interrupting the operation of the motor 340 (S41). Next, the microprocessor 360 further determines whether a total number of the interruption periods, which are stored in the memory 370 up to the present time, is greater than a threshold frequency value $N_{predetermined}$ (S39). If the total number of periods is determined to be greater than the threshold frequency value in step S39, the microprocessor 360 sends a display control signal to the display unit 350 to display a message indicating malfunction of the motor 340 to the user (S40). Using the apparatus and method according to the third embodiment of the present invention, a user can easily and conveniently be notified of malfunction of the motor 340 when the operation of the motor is not completely stopped within a predetermined length of time upon receiving an interruption command from the microprocessor 360. Therefore, the user can repair the motor in advance without damaging the motor or any other component of the washer.

Embodiment (4)

Figure 4A:
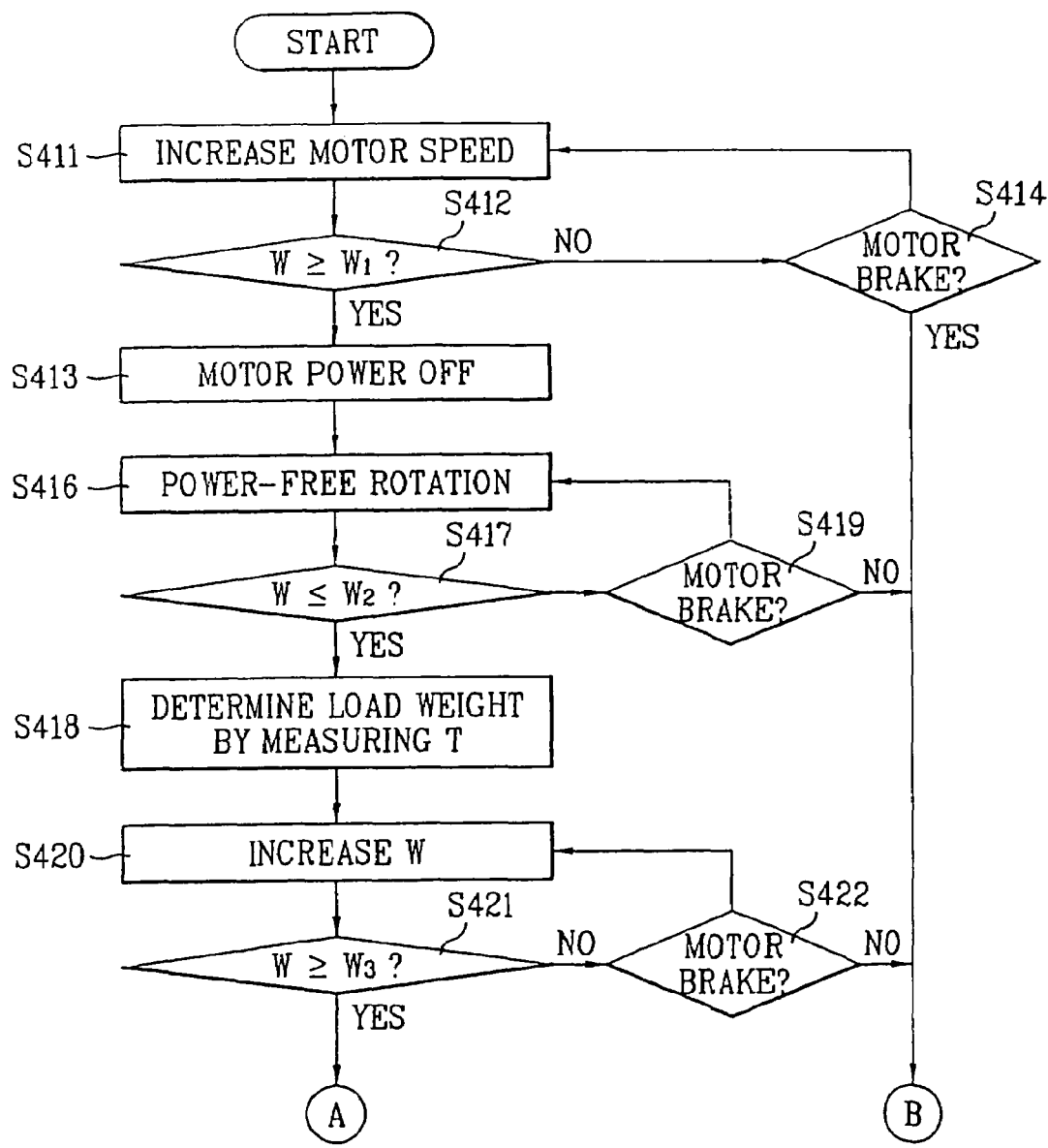
FIG. 4A and FIG. 4B illustrate a method of interrupting (braking) operation of a motor in a washer according to a fourth embodiment of the present invention.
Figure 4B:
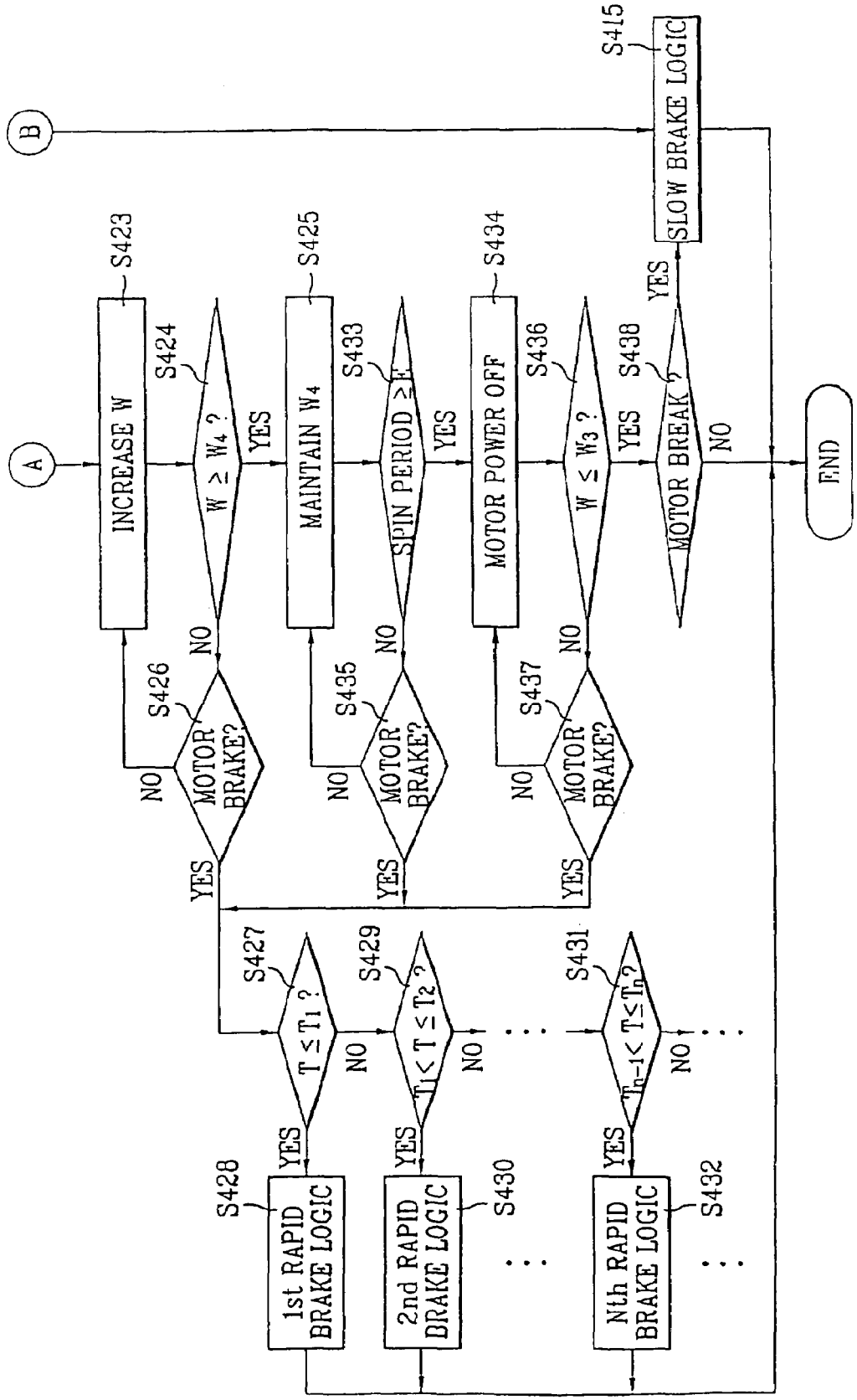

FIG. 4 illustrates a method of interrupting (braking) operation of a motor in a washer according to a fourth embodiment of the present invention. The washer includes a motor rotating a tub or an agitator, a microprocessor generating control signals to control operation of the motor. Referring to FIG. 4, the microprocessor of the washer initially increases the speed of the motor W (S411). When W is determined to be greater or equal to a first predetermined speed $W_1$ (S412), the microprocessor turns the motor power off (S413). On the other hand, if W is determined to be less than $W_1$ in step S412 and if interruption of the motor operation is ordered (S414), the microprocessor interrupts (brakes) the motor operation based on a slow-brake logic (S415). The interruption of the motor operation gets ordered when a user inputs a command for interrupting (braking) the motor operation by turning the power of the washer off, opening a washer door, or manually touching a key control panel.

After the motor power is turned off in step S413, power-free rotation of the motor occurs and thereby W gradually decreases (S416). If the microprocessor determines that the microprocessor determines whether W is less than or equal to a second predetermined speed $W_2$ being less than $W_1$ (S417), it determines the weight of a load of clothes being contained in the tub by measuring T that represents a length of time that it takes for W to decrease from $W_1$ to $W_2$ (S418). On the other hand, if W is determined to be still greater than $W_2$ in step S417 and if interruption of the motor operation is ordered (S419), step S415 is repeated.

After the load weight is determined in step S418, the microprocessor increases W (S420). If W is determined to be greater than or equal to a third predetermined speed $W_3$ which is greater than $W_1$ (S421), the microprocessor further increases W (S423). On the other hand, if W is determined to be less than $W_3$ in step S421 and if interruption of the motor operation is ordered (S422), step S415 is repeated. Referring back to step S423, if W is determined to be greater than or equal to a fourth predetermined speed $W_4$ which is greater than $W_3$ (S424), the microprocessor maintains the motor speed to $W_4$ and performs a spin cycle (S425).

If W is determined to be less than $W_4$ in step S424 and if interruption of the motor operation is ordered (S426), the microprocessor selects one of a plurality of rapid-brake logics on the basis of T measured in step S418 and interrupts or brakes the motor operation according to the selected rapid-brake logic (S427-S432). For example, if T is determined to be less than or equal to a first predetermined length of time $T_1$ (S427), the microprocessor brakes the motor operation based on a first rapid-brake logic (S428). And if T is determined to be greater than $T_1$ but less than or equal to a second predetermined length of time $T_2$ (S429), the motor operation is interrupted based on a second rapid-brake logic (S430). In other words, if T is determined to be greater than an (n−1)th predetermined length of time $T_{n-1}$ but less than or equal to an nth predetermined length of time $T_n$ where n=2, 3, 4, ... N (S431), the microprocessor brakes the motor operation based on an nth rapid-brake logic (S432).

Referring back to step S425, if a spin period, during which $W_4$ is maintained, is determined to be greater than or equal to a predetermined period of time E (S433), the microprocessor turns off the motor power (S434). On the other hand, if the spin period is determined to be less than E in step S433 and if interruption of the motor operation is ordered (S435), the microprocessor selects on of the plurality of rapid-brake logics on the basis of T measured in step S428 and interrupts the motor operation according to the selected rapid-brake logic (S427-S432). After the motor power is turned off in step S434, if the microprocessor determines in step S436 that W is less than or equal to $W_3$ and if interruption of the motor operation is ordered (S438), step 415 is repeated. In addition, if W is determined to be greater than $W_3$ in step S436 and if interruption of the motor operation is ordered (S437), steps S427 to S432 are repeated.

In the method of interrupting operation of the washer motor shown in FIG. 4, an appropriate motor brake logic is selected based on the weight of the load of clothes so that the optimal interruption of the motor operation can be achieved while avoiding any damage on the motor or any other components that associate with the motor.

Embodiment (5)

Figure 5A:
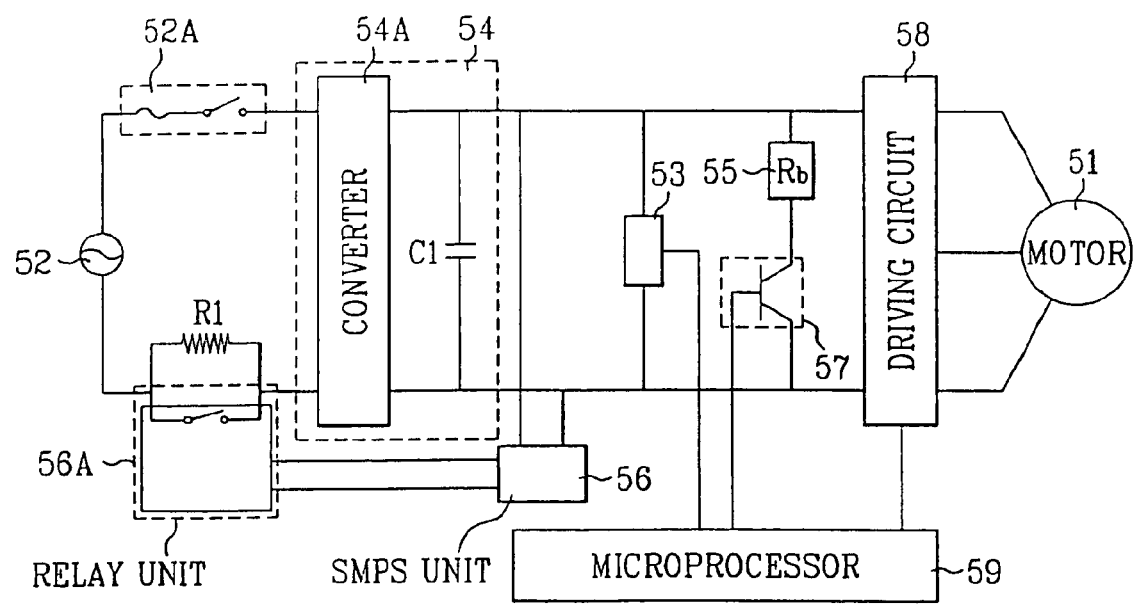
FIG. 5A illustrates a control system that drives a motor provided in a washer according to a fifth embodiment of the present invention.

FIG. 5A illustrates a control system that drives a motor provided in a washer according to a fifth embodiment of the present invention. Referring to FIG. 5A, the control system includes a transformer 54 having a converter 54A and a first capacitor $C_1$ for converting the AC power generated by the AC power source 52 into DC power, a switch 52A connecting or disconnecting the AC power source 52 to the transformer 54, and a switching mode power supply (SMPS) unit 56 transforming the DC voltage converted by the transformer 54 into a voltage having a predetermined level.

The motor control system shown in FIG. 5A further includes a relay unit 56A which is connected between the SMPS unit 56 and the AC power source 52 and cuts off the AC power if its frequency is higher than a predetermined frequency value, a first resistor $R_1$ connected to the relay unit 56A in parallel, a motor 51 rotating a tub or an agitator in the washer, a driving circuit 58 driving the motor 51 by supplying the voltage converted by the SMPA unit 56 to the motor 51, a microprocessor 59 controlling operation of the motor 51, an insulated gate bipolar transistor (IGBT) 57 performing pulse width modulation upon receiving a control signal from the microprocessor 59, a voltage comparator 53 comparing the reverse voltage generated by the motor 51 during a motor brake with a predetermined voltage value, and a braking resistor 55 dissipating the reverse voltage generated by the motor 51 into heat so as to prevent possible circuit damages due to the reverse voltage.

Figure 5B:
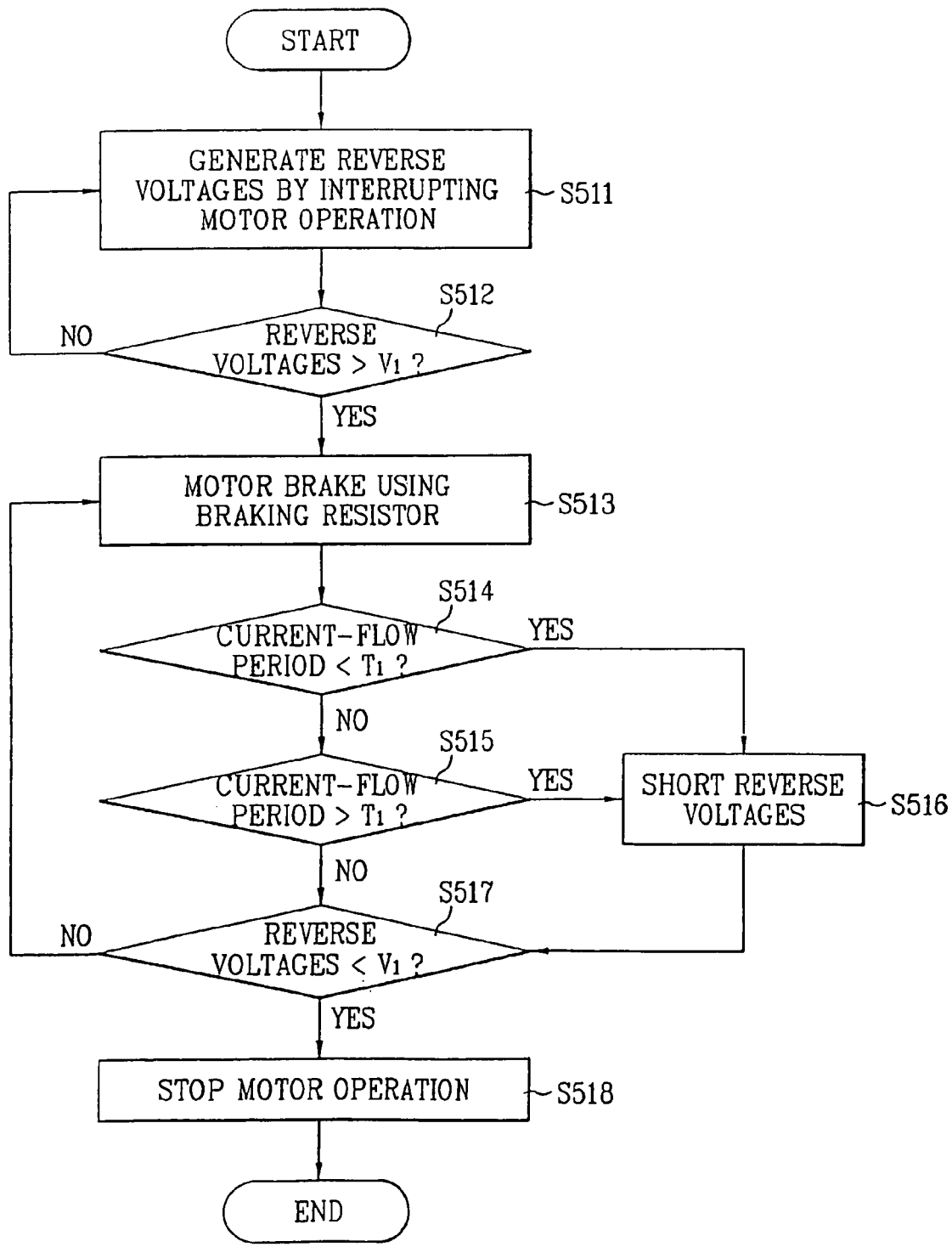
FIG. 5B illustrates a method of controlling a motor in a washer according to the fifth embodiment of the present invention.

Reference will now be made in detail to a method of controlling a motor in a washer according to the fifth embodiment of the present invention, which is illustrated in FIG. 5B. Referring to FIG. 5B, when the microprocessor 59 determines that any one of the conditions for braking operation of the motor 51 is met, it sends interruption signals to the motor driving circuit 58, which then applies phase-reversed input voltages to the motor 51 (S511). In step S511, the reverse voltages are then generated by the motor 51 due to its rotation and they are applied to the driving circuit 58. In a case where the motor 51 is driven by three input voltages having three different phases, the reverse voltages generated by the motor 51 during the motor brake also have three phases. Therefore, the phases of the reverse voltages depend on the phases of the input voltages that the driving circuit 58 applies to the motor 51.

After the reverse voltages are generated by the motor 51 in step S511, the microprocessor 59 measures the reverse voltages generated in step S511 and determines whether the measured reverse voltages are greater than a predetermined voltage value $V_1$ (S512). If they are, the microprocessor 59 generates control signals for a normal motor brake, in which the braking resistor 55 is allowed to dissipate energy due to the reverse voltages generated by the motor 51 into heat (S513). Otherwise, steps S511 and S512 are repeated until the reverse voltages are determined to be greater than $V_1$.

Next, the microprocessor 59 measures a current-flow period of the braking resistor 55 which represents a length of time that a reverse current flows through the braking resistor 55 when the reverse voltages are generated by the motor 51, and it further determines whether the measured current-flow period is less than a normal dissipate period $T_1$ (S514). $T_1$ represents a period of time that it takes to dissipate all the reverse voltages by the braking resistor 55 in a normal condition. If the measured current-flow period is less than $T_1$, the microprocessor 59 determines that the braking resistor 55 is opened.

If the measured current-flow period is determined to be not less than the $T_1$, the microprocessor 59 determines whether the measured current-flow period is greater than $T_1$ (S515). If the measured current-flow period is greater than $T_1$, it determines that the braking resistor 55 is shorted. If it is determined that the measured current-flow period is less than or greater than $T_1$ in step S514 or S515, the microprocessor 59 shorts a corresponding node connected to the driving circuit 58 for a predetermined period of time so as to reduce the reverse voltages generated by the motor 51 (S516). When the node connected to the driving circuit 58 is shorted, the reverse voltages of the motor 51 are reduced due to their phase differences. By doing so, any circuit damage caused by high reverse voltages of the motor 51 can be prevented during the motor brake.

After the reverse voltages are reduced in step S516 or the measured current-flow period of the braking resistor 55 is determined to be not greater than $T_1$ in step S515, the microprocessor 59 measures the reverse voltages of the motor 51 again and determines whether the measured reverse voltages are less than the predetermined voltage value $V_1$ (S517). If they are, the microprocessor 59 terminates the operation of the motor 51 (S518).

Embodiment (6)

Figure 6A:
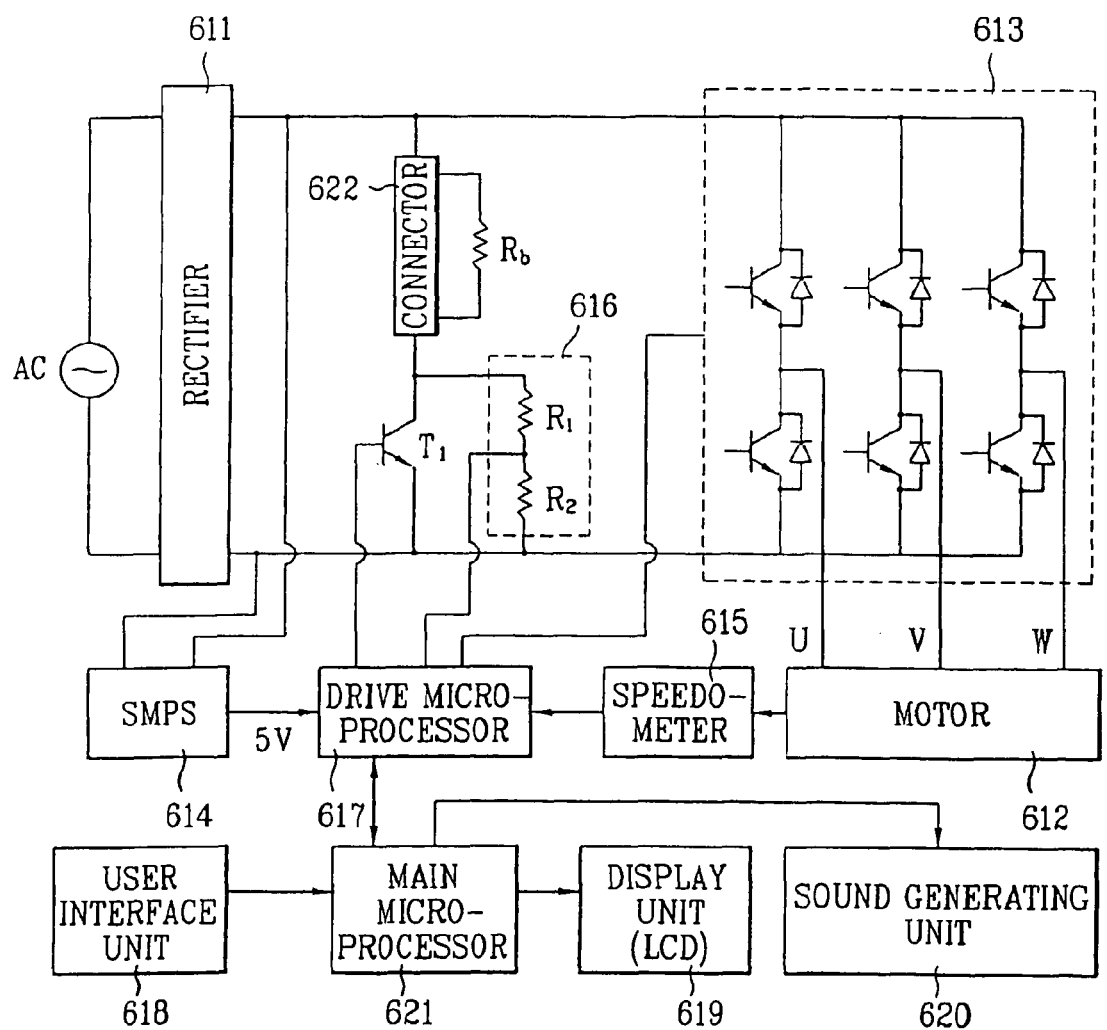
FIG. 6A illustrates a control system that drives a motor provided in a washer according to a sixth embodiment of the present invention.

FIG. 6A illustrates a control system that drives a motor provided in a washer according to a sixth embodiment of the present invention. As shown in FIG. 6A, the system includes a rectifier 611 rectifying the AC power, a motor 612 rotating a tub or an agitator of the washer, and a driving circuit 613 comprising a plurality of insulating gate bipolar transistors (IGBT). The driving circuit 613 applies input voltages U, V, and W having three different phases, respectively, to the motor 612 in a first operation mode and applies phase-reversed voltages to the motor 612 in a second operation mode so that the reverse voltages generated by the motor 612 due to its rotation are applied to the driving circuit 613.

The system shown in FIG. 6A further includes a switching mode power supply (SMPS) unit 614 transforming the output of the rectifier 611 into a voltage having a predetermined level (e.g., 5V), a speedometer 615 measuring the rotational speed of the motor 612, a braking resistor $R_b$ dissipating the reverse voltages generated by the motor 612 into heat so as to prevent possible circuit damages, and a transistor $T_1$ driving the braking resistor $R_b$. The system further includes a voltmeter 616 that measures the output voltage of the rectifier 611 after the reverse voltage of the motor 612 is dissipated in $R_b$, a driver microprocessor 617 controlling operations of the driving circuit 613 and the transistor $T_1$ on the basis of the output voltage measured by the voltmeter 616, a door opening sensor (not illustrated) detecting opening of a washer door and sending a corresponding signal to the drive microprocessor 617, a user interface unit 618 having at least one a touch panel and a key input unit for receiving operational commands from a user, a display unit (e.g., LCD) 619 displaying a message indicating the operation status of the washer, a sound generating unit 620, and a main microprocessor 621 controlling the drive microprocessor 617 so as to operate various components of the washer including the motor 612 according to the operational commands received by the user interface unit 618.

The main microprocessor unit 621 detects an abnormal output voltage of the rectifier 611 by communicating with the drive microprocessor 617 and generates control signals to the display unit 619 and the sound generating unit 620 so as to display a warning message and a warning sound indicating the abnormal output voltage of the rectifier 611. Because the brake resistor $R_b$ is detachably provided in the control system as shown in FIG. 6A and the voltmeter 616 measures the output voltage of the rectifier 611 using $R_b$, the output voltage of the voltmeter 616 will be 0V if $R_b$ is not provided at all or the connector 622 is inoperatively provided.

Reference will now be made in detail to the operation of the control system shown in FIG. 6A. When a user inputs commands for a wash cycle through the user through interface unit 618, the main microprocessor 621 transmits control signals to the drive microprocessor 617 so as to drive various components of the washer based on a plurality of operation parameters corresponding to a wash option selected by the user. The drive microprocessor 617 initially rotates the motor 612 while monitoring the speed of the motor 612 and performs the wash cycle by operating other components such as a water supply system and a water drain system. On the other hand, the main microprocessor 621 generates control signals to the display unit 619 for displaying a current operation status of the washer and to the sound generating unit 620 for generating a warning sound if necessary.

During a wash cycle, the rotational direction of the motor 612 alternates between a clockwise direction and a counter-clockwise direction. For example, in order to switch the direction of the motor 612 which was initially rotating in a clockwise direction in a first mode, the rotation of the motor 612 must be initially stopped. In addition, such brake or interruption of the motor operation is often necessary when a washer door is opened by a user during a spin (dehydration) cycle.

Therefore, when the drive microprocessor 617 determines that any one of the conditions for braking the motor operation is met, it operates the driving circuit 613 in a second operation mode, in which the driving circuit 613 applies phase-reversed input voltages to the motor 612 and the brake resistor $R_b$ operates to dissipates the reverse voltage generated by the motor 611 so as to prevent any circuit damages.

Figure 6B:
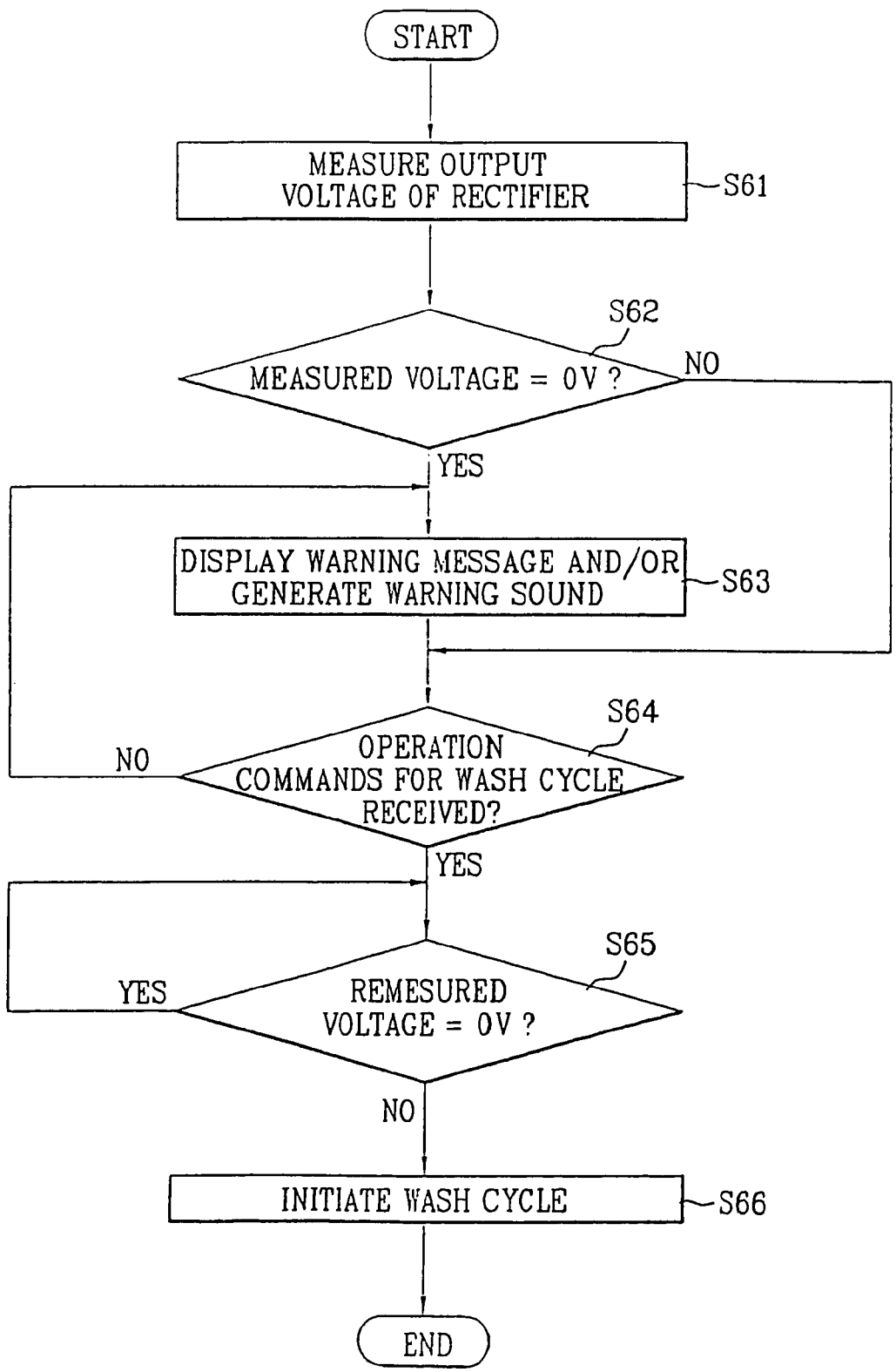
FIG. 6B illustrates a method of controlling a motor in a washer according to the sixth embodiment of the present invention.

FIG. 6B is a flow chart illustrating a method of controlling a motor in a washer according to the sixth embodiment of the present invention. Initially, the drive microprocessor 617 measures the output voltage of the rectifier 611 using the voltmeter 616 (S61). Next, if the drive microprocessor 617 determines that the measured output voltage is 0V (S62), it transmits to the main microprocessor 621 a warning signal indicating that the brake resistor $R_b$ is not connected at all or is improperly connected. Because the voltmeter 611 measures the output voltage of the rectifier 611 passing through $R_b$ using a pair of resistors $R_1$ and $R_2$ connected in series, the measured voltage of 0V indicates that the power source voltage is being applied but $R_b$ is improperly connected.

Upon receiving the warning signal from the drive microprocessor 617, the main microprocessor 621 generate controls signals to the display unit 619 and the sound generating unit 620 for displaying a warning message indicating $R_b$ is improperly connected and for generating a warning sound (S63). If it is determined in step S62 that the output voltage is not 0V, step S63 is skipped. Next, if the main microprocessor 621 determines that operational commands for a wash cycle are inputted by a user through the user interface unit 618 (S64), it further measures the output voltage of the rectifier 611 using the voltmeter 616 and determines whether the measured output voltage is 0V (S65). If it is, the main microprocessor does not initiate the wash cycle but repeats step S65 after being in a standby mode for a predetermined period of time. This step is essentially important for preventing any chance of damaging the control system shown in FIG. 6A.

On the other hand, if it is determined in step S65 that the measured output voltage is not 0V (meaning that $R_b$ is now properly connected), the main microprocessor 621 initiates the wash cycle by generating control signals to the drive microprocessor 617 so as to operate various components of the washer including the motor 621 according to the operational commands received from the user (S26).

Embodiment (7)

Figure 7A:
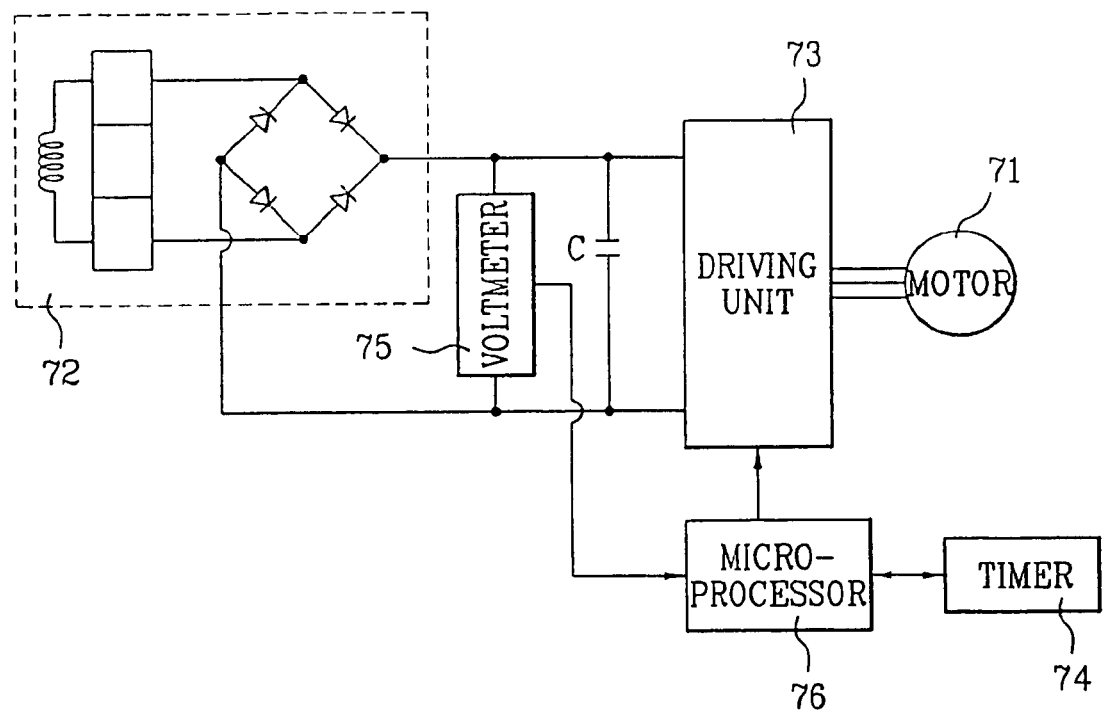
FIG. 7A illustrates a control system controlling a motor in a washer according to a seventh embodiment of the present invention.

FIG. 7A illustrates a control system controlling a motor in a washer according to a seventh embodiment of the present invention. Referring to FIG. 7A, the control system includes a motor 71 rotating a tub or an agitator of the washer, a transformer 72 generating a DC power voltage, and a motor driving unit 73 driving the motor 71 by applying the DC power voltage to the motor 71. The control system shown in FIG. 7A further includes a timer 74 counting a predetermined deceleration period, a voltmeter 75 measuring the reverse voltages generated due to reverse currents generated by the motor 71 when interrupted, and a microprocessor 76 that generates a control signal to the driving unit 71 to decrease the motor speed if the measured reverse voltages are less than a predetermined voltage value.

The microprocessor 76 initially accelerates the motor speed and controls the timer 74 to repeatedly count a predetermined deceleration period so as to reduce the initially accelerated motor speed for each deceleration period. In addition, the microprocessor 76 measures the DC input voltage of the motor driving unit 71 for each deceleration period and maintains a standby status to reduce the input voltage of the driving circuit 71 if the measured input voltage is higher than a predetermined voltage level. The voltmeter 75 is connected to the DC link in parallel and includes three resistors which are connected in series. Therefore, the output of the voltmeter 75 is a voltage subdivided by the resistors of the voltmeter 75.

On the other hand, if the measured DC voltage of the driving unit 71 is less than the predetermined voltage level, the microprocessor 76 measures the current leading phase angle Φ and reduces the motor speed by reducing the leading phase angle by a predetermined rate for each deceleration period. If the leading phase angle Φ becomes zero, the microprocessor 76 obtains the current pulse width modulation (PWM) duty and reduces the motor speed by reducing the PWM duty by a predetermined rate for each deceleration period.

Figure 7B:
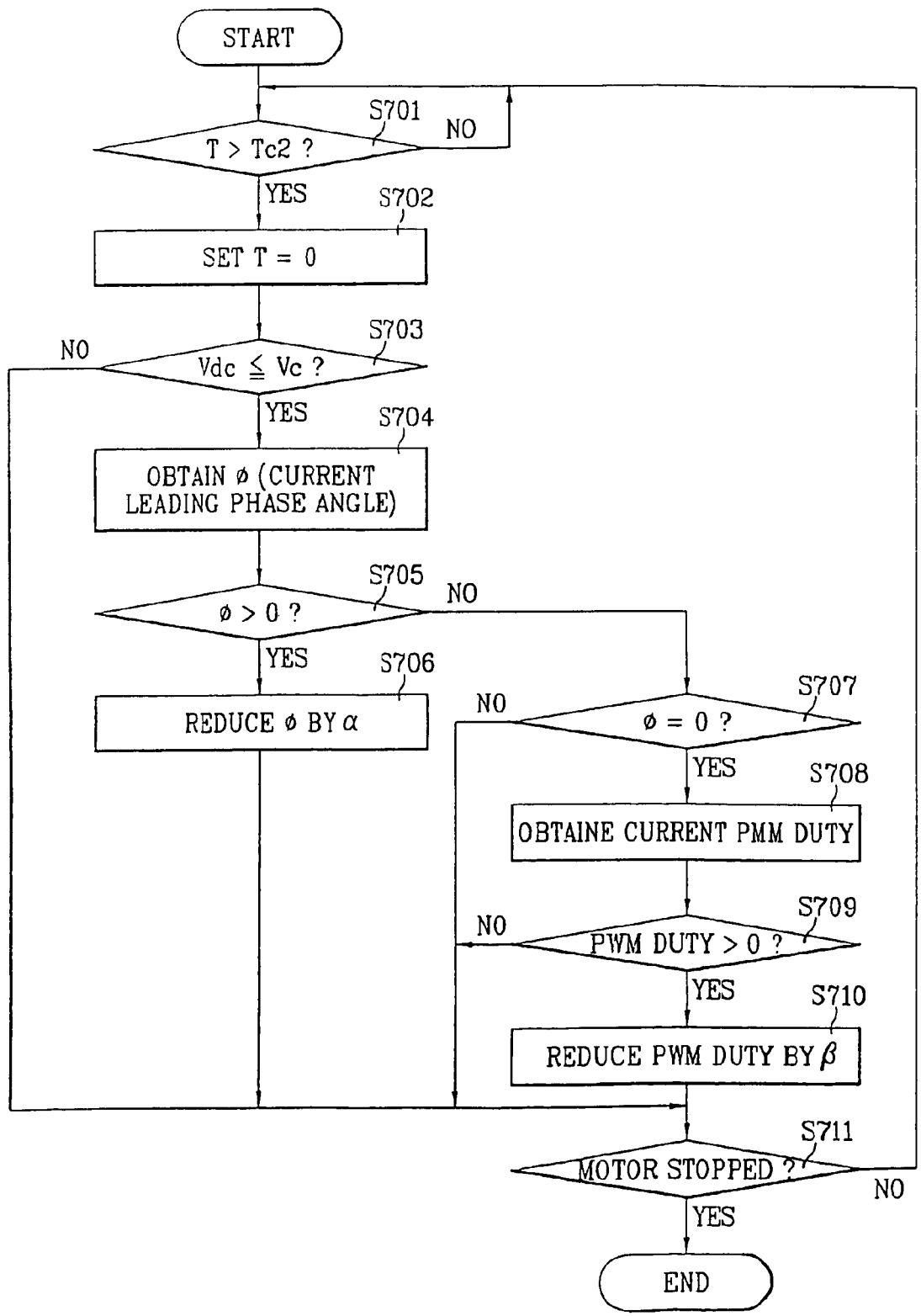
FIG. 7B illustrates a method of controlling a motor in a washer according to the seventh embodiment of the present invention.

Reference will now be made in detail to a method of controlling a motor in a washer according to the seventh embodiment of the present invention, which is illustrated in FIG. 7B. When the algorithm shown in FIG. 7B starts, the microprocessor 76 sends to a control signal to the timer 74 to start measure a time T and determines whether a predetermined deceleration period $T_c$ is elapsed by checking whether T is greater than $T_c$ (S701). If $T_c$ is elapsed, the microprocessor 76 initializes the timer 74 by setting T to zero (S702) and determines whether the current DC voltage V of the driving unit 71 is less than or equal to a predetermined voltage level $V_c$ (S703). If it is determined in step S703 that V $V_c$, then the microprocessor 76 measures the current leading phase angle Φ of the DC voltage V of the driving unit 71 (S704). If the measured leading phase angle Φ is greater than zero (S705), the microprocessor 76 reduces the leading phase angle Φ by a predetermined level a (S706). Thereafter, if the microprocessor 76 determines that the motor 71 is not stopped (S711), step S701 and all the following steps are repeated again as shown in FIG. 7B.

On the other hand, if it is determined in step S705 that the measured leading phase angle Φ is not greater than zero, the microprocessor 76 further determines whether the measured leading phase angle Φ is equal to zero (S707). If it is equal to zero, the microprocessor 76 obtains the current PWM duty (S708). If the current PWM duty is greater than zero (S709), it reduces the PWM duty by a predetermined level β. Next, if it determines that the motor is not stopped (S711), all the previous steps are repeated again. In addition, if it is determined in step S704 that the measured DC voltage V is greater than $V_c$, steps S704 to S719 are skipped and step S711 is performed.

Embodiment (8)

Figure 8A:
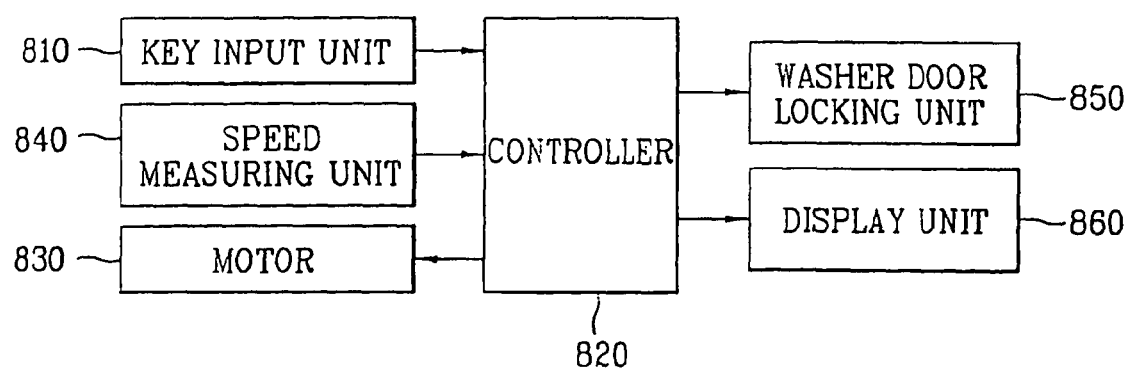
FIG. 8A illustrates an apparatus of controlling operation of a motor in a washer according to an eighth embodiment of the present invention.
Figure 8B:
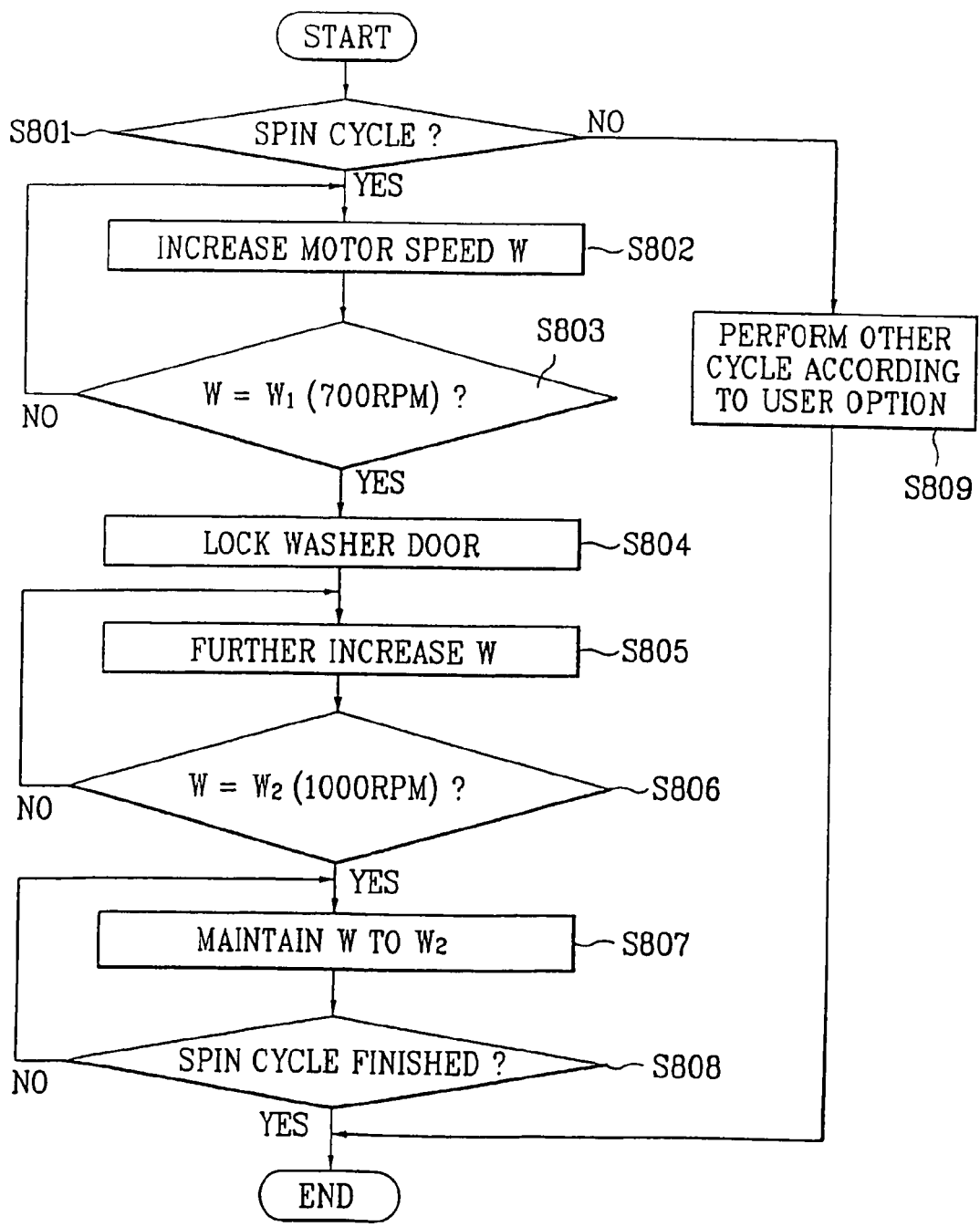
FIG. 8B illustrates a method of controlling operation of a motor in a washer according to the eighth embodiment of the present invention.

FIG. 8A illustrates an apparatus of controlling operation of a motor in a washer according to an eighth embodiment of the present invention. Referring to FIG. 8A, the apparatus includes a key input unit 810 receiving commands from a user for a wash cycle, a motor 830 rotating a tub and/or an agitator of the washer, and a controller 820 generating control signals to perform the wash cycle according to a wash option selected by the user and to lock a wash door (not illustrated) if the speed of the motor 830 is equal to a predetermined speed. The apparatus shown in FIG. 8A further includes a washer door locking unit 850 that locks or unlocks the washer door of the washer, a speed measuring unit (e.g., a speedometer) 840 measuring the rotating speed of the motor 830 and providing the measured speed to the controller 820, and a display unit 860 that displays a message indicating the locking status of the washer door upon receiving a control signal from the controller 820.

When a user inputs commands for a wash cycle through the key input unit 810, the controller 820 generate control signals to perform a wash cycle, a rinse cycle, and a spin (dehydration cycle). After the spin cycle is initiated, the controller 820 generates a control signal to the wash door locking unit 850 to lock the washer door when the speed of the motor 830 reaches a first predetermined motor speed. When the speed of the motor further reaches a second predetermined motor speed, the controller 820 maintains the speed of the motor 830 until the spin cycle is finished.

Reference will now be made in detail to a method of controlling operation of a motor in a washer according to the eighth embodiment of the present invention. Referring to FIG. 5B, if the controller 820 determines that a spin cycle (dehydration cycle) is ordered (S801), it increases the speed W of the motor 830 (S802). Next, if the controller 820 determines that W is equal to a first predetermined motor speed $W_1$, e.g., 700 RPM (S803), it sends a control signal to the washer door locking unit 850 to lock the washer door of the washer (S804). If W is determined to be less than $W_1$ in step S803, the controller 820 repeats step S802 until W becomes $W_1$. After the washer door is locked in step S804, the controller 820 further increases the motor speed W (S805). If it is determined that W has reached a second predetermined motor speed $W_2$, e.g., 1000 RPM, which is greater than $W_1$ (S806), the controller 820 maintains the motor speed W until the spin cycle is finished (S807 and S808). As described above, the controller 820 does not lock the washer door until the speed of the motor 830 reaches to the first predetermined motor speed $W_1$ so that the power consumption and durability of the door lock are greatly improved.

Embodiment (9)

Figure 9A:
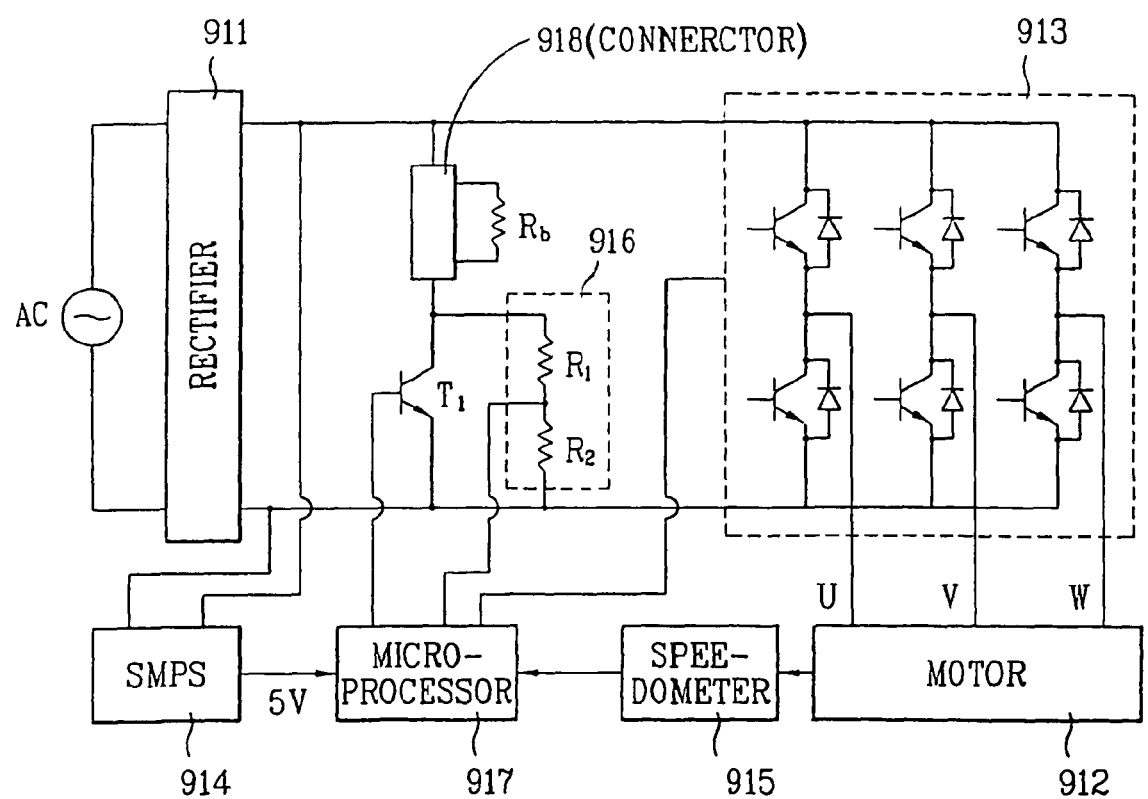
FIG. 9A illustrates a control system that drives a motor provided in a washer according to a ninth embodiment of the present invention.

FIG. 9A illustrates a control system that drives a motor provided in a washer according to a ninth embodiment of the present invention. The motor control system shown in FIG. 9A illustrates a rectifier 911 rectifying the AC power, a motor 912 rotating a tub or an agitator of the washer, and a driving circuit 913 comprising a plurality of insulating gate bipolar transistors (IGBT). The driving circuit 913 applies input voltages U, V, and W having three different phases, respectively, to the motor 912 in a first mode and applies phase-reversed voltages to the motor 912 in a second mode so that the reverse voltages generated by the motor 912 due to its rotation are applied to the driving circuit 913.

The control system shown in FIG. 9A further includes a switching mode power supply (SMPS) unit 914 transforming the output of the rectifier 911 into a voltage having a predetermined level (e.g., 5V), a speedometer 915 measuring the rotational speed of the motor 912, a braking resistor $R_b$ dissipating the reverse voltages generated by the motor 912 into heat so as to prevent possible circuit damages, and a transistor $T_1$ driving the braking resistor $R_b$. The control system further includes a voltmeter 916 measuring the output voltage of the rectifier 911 after the reverse voltages of the motor 912 are dissipated in $R_b$, a microprocessor 917 controlling operations of the driving circuit 913 and the transistor $T_1$ on the basis of the output voltage measured by the voltmeter 916, and a door opening sensor (not illustrated) detecting opening of a washer door and sending a corresponding to the microprocessor 917.

Figure 9B:
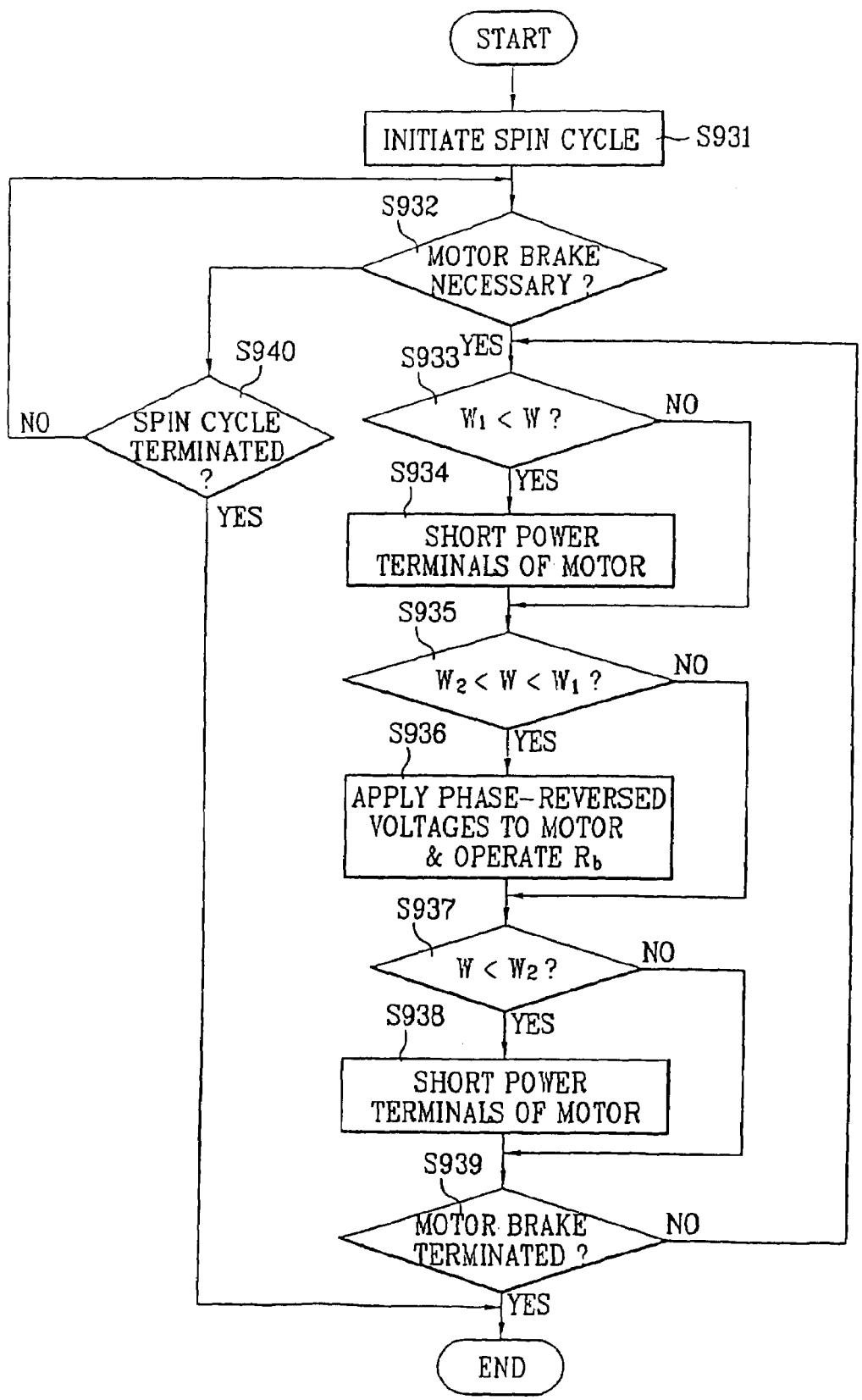
FIG. 9B illustrates a method of controlling a motor in a washer according to the ninth embodiment of the present invention.

Reference will now be made in detail to a method of controlling a motor in a washer according to the ninth embodiment of the present invention, which is illustrated in FIG. 9B. Referring to FIG. 9B, when a user inputs commands for washing a load of clothes to be washed, the microprocessor 917 operates the driving circuit 913 so as to rotate the motor 912 based on a wash algorithm or program that correspond to the user input commands so that a tub and an agitator of the washer are rotated for performing wash and rinse cycles. Thereafter, the microprocessor 917 initiates a spin (dehydration) cycle by increasing the speed of the motor 912 (S931). The speed of the motor 912 in a spin cycle should be determined based on a total weight of the load of clothes to be dehydrated or weight distribution of the load, but is typically greater than 100 rpm.

After a spin cycle is initiated in step S931, the microprocessor 917 determines whether a motor brake is necessary by determining any one of the conditions for braking motor operation is met (S932). For example, if a motor interruption command inputted by a user or a signal indicating opening of a washer door is received, or if the speed of the motor 912 measured by the speedometer 915 is determined to be abnormal, the microprocessor 917 determines that interruption (brake) of the motor operation is necessary. If any one of such conditions is met, the microprocessor 917 determines whether the current speed W of the motor 912 is greater than a first critical speed $W_1$ (S933). $W_1$ (typically set to 1000 rpm) represents the minimum speed of the motor 912 that can mechanically damage the motor 912 or any other components that associate with the motor 912 (e.g., a clutch) when a rapid brake of the motor operation is performed. If it is determined in step S933 that W is greater than $W_1$, the microprocessor 917 controls the driving circuit 913 to short power input terminals of the motor 912 for a predetermined period of time in order to brake the motor operation (S934). By doing so, rather a slow motor brake is achieved so that any mechanical damage due to a rapid motor brake can be prevented.

Next, the microprocessor 917 further determines whether the current speed W of the motor 912 is less than $W_1$ and is greater than a second critical speed $W_2$ (S935). $W_2$ (typically set to 100 rpm) represents the allowable speed of the motor 912 that does not create any mechanical damage even if a rapid brake of the motor operation is performed. If it is determined in step S935 that W is less than $W_1$ and is greater than $W_2$, then microprocessor 917 performs a rapid motor brake by operating the driving circuit 913 to apply phase-reversed voltages to the motor 912 for a predetermined period of time and by operating the brake resistor $R_b$ so as to dissipate the reverse voltages generated by the motor 912 during the rapid motor brake (S936). In the method shown in FIG. 9B, a same rapid brake is performed when W is in a signal speed range of $W_1$ to $W_2$. However, different rapid brakes can be performed for a plurality of subdivided ranges of the motor speed by using different duty rations when applying the phase-reversed voltages to the motor 912.

Furthermore, the microprocessor 917 further determines whether the current speed W of the motor 912 is less than $W_2$ (S937). If it is, the microprocessor 917 controls the driving circuit 913 to short the power input terminals of the motor 912 in order to brake the motor operation (S938). Since W is less than 100 rpm, the motor operation can be easily. Thereafter, if the microprocessor 917 determines that the motor operation is terminated (S939), then it ends the motor control algorithm. Otherwise, steps S933 to S939 are repeated.

Referring back to step S932, if none of the conditions for braking motor operation are met and if the spin cycle is determined to be terminated in step S940, the microprocessor 917 ends the motor control algorithm.

Embodiment (10)

Figure 10:
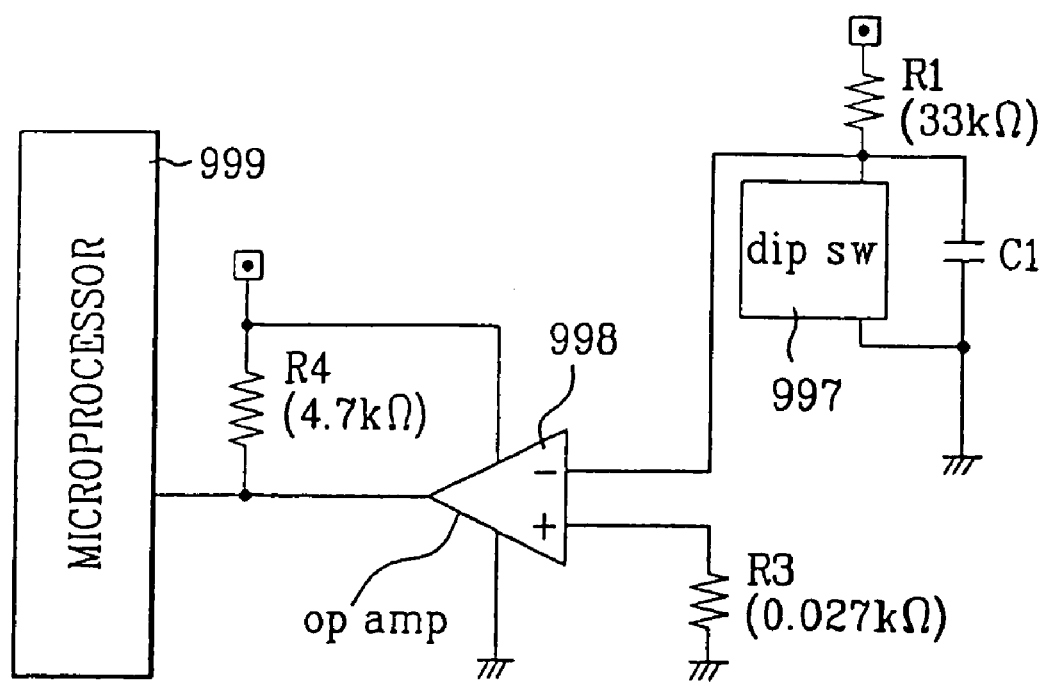
FIG. 10 illustrates a circuitry for limiting a motor current in an electrical appliance according to a tenth embodiment of the present invention.

FIG. 10 illustrates a circuitry for limiting a motor current in an electrical appliance according to a tenth embodiment of the present invention. Referring to FIG. 10, the current limiting circuitry includes a microprocessor 999, a power source $V_{cc}$ supplying a source voltage of 5V, a first resistor $R_1$ having a resistance of 33 k and a dip switch 997 connected between the power source $V_{cc}$ and a ground in series, a capacitor $C_1$ connected to the dip switch 997 in parallel, an op amp 998 having an inverting input connected to a node between R1 and the dip switch 997 and an output connected to the microprocessor 999, and a third resistor $R_3$ having a resistance of 0.027 k, which is connected between the noninverting input of the op amp 998 and a ground.

Reference will now be made in detail to the operation of the current limiting circuitry shown in FIG. 10. The dip switch 997 comprises a plurality of resistors having different resistances (e.g., 1.3 k, 1.5 k, 1.8 k, 2.0 k, and so on). Therefore, an appropriate one of the plurality of resistors can be conveniently selected for selecting a limited current value. For example, if a resistor having a resistance of 1.3 k is selected by the dip switch 997, then the limited current that flows through R3 is $$I=\{(5*1.3)/(33+1.3)\}/0.027=7 \text{ A}.$$

Alternatively, if a resistor having a resistance of 1.8 k is selected by the dip switch 997, the limited current that flows through R3 is $$I=\{(5*1.8)/(33+1.8)\}/0.027=9 \text{ A}.$$

As shown in the examples shown above, the value of the limited current that flows through R3 is varied based on the switching of the dip switch 997. When more than one resistors are selected by the dip switch 997, the value of the current that flows through R3 can be even lower since the selected resistors are in parallel. Instead of using the dip switch 997, a resistance-variable resistor can be used. However, it has a disadvantage that it is difficult to set a precise resistance value of the resistance-variable resistor.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of controlling a motor-driven washing machine, the method comprising the steps of:
    determining weight of a load of clothes being contained in a tub;
    braking the motor according to a slow brake logic if a interruption of the motor is ordered when the motor speed is less than or equal to a third predetermined speed(W3);
    selecting one of a plurality of rapid-brake logics on the basis of the measured weight of a load of clothes and braking the motor according to the selected rapid-brake logic if a interruption of the motor is ordered when the motor speed is greater than or equal to a third predetermined speed(W3) and a spin period is determined to be less than a predetermined period of time(E); and
    braking the motor according to the selected rapid-brake logic based on the measured weight of a load of clothes when the motor speed is greater than or equal to a third predetermined speed(W3) if a interruption of the motor is ordered after the spin period is determined to be greater than or equal to the predetermined period of time(E) and the motor power is turned off.

2. The method of claim 1, wherein the method comprising the steps of:
    increasing a speed of a motor from zero to a first predetermined speed W1 to initiate a spin cycle, during which the motor rotates a washing tub containing a load of clothes to be dehydrated;
    reducing the motor speed from W1 to a second predetermined speed W2 and measuring a deceleration period that it takes to reduce the motor speed from W1 to W2;
    increasing the motor speed from W2 to a third predetermined speed W3;
    braking the motor according to a slow brake logic if a first interruption of the motor is ordered during the step of increasing the motor speed from W2 to W3;
    increasing the motor speed from W3 to a fourth predetermined speed W4; and
    selecting one of plurality of rapid-brake logics on the basis of the measured deceleration period and braking the motor according to the selected rapid-brake logic if a second interruption of the motor is ordered during the step of increasing the motor speed from W3 to W4.

3. The method of claim 2, wherein the step of reducing the motor speed from W1 to W2 is achieved by cutting off a power supply to the motor in motion.

4. The method of claim 2, further comprising the steps of:
    maintaining the motor speed of W4 for a predetermined spin period; and
    braking the motor according to the selected rapid-brake logic if a third interruption of the motor is ordered during the step of maintaining the motor speed of W4.

5. The method of claim 2, further comprising the steps of:
    reducing the motor speed from W4 to zero to terminate the spin cycle; and
    braking the motor in motion according to the selected rapid-brake logic if a third interruption of the motor is ordered during the step of reducing the motor speed from W4 to zero and if the motor speed is greater than W3.

6. The method of claim 5, further comprising the step of braking the motor according to the slow brake logic if the third interruption of the motor is ordered during the step of reducing the motor speed from W4 to zero and if the motor speed is less than or equal to W3.

7. The method of claim 5, wherein the step of reducing the motor speed from W4 to zero is achieved by cutting off a power supply to the motor in motion.

8. The method of claim 2, further comprising the step of braking the motor according to the slow brake logic if a third interruption of the motor is ordered during the step of increasing the motor speed from zero to W1.

9. The method of claim 2, further comprising the step of braking the motor according to the slow brake logic if a third interruption of the motor is ordered during the step of reducing the motor speed from W1 to W2.

10. The method of claim 2, wherein the first interruption of the motor is ordered when a user inputs a motor-interrupting command by turning the power of the washing machine, opening of a washer door, or manually touching a key control panel during the step of increasing the motor speed from W2 to W3.

11. The method of claim 2, wherein the second interruption of the motor is ordered when a user inputs a motor-interrupting command by turning the power of the washing machine, opening of a washer door, or manually touching a key control panel during the step of increasing the motor speed from W3 to W4.

* * * * *